United States Patent [19]

Schauder

[11] Patent Number: 4,885,518

[45] Date of Patent: Dec. 5, 1989

[54] INDUCTION MOTOR TORQUE/FLUX CONTROL SYSTEM

[75] Inventor: Colin D. Schauder, Murrysville Boro., Pa.

[73] Assignee: Westinghouse Electric Corp., Pittsburgh, Pa.

[21] Appl. No.: 87,939

[22] Filed: Aug. 21, 1987

[51] Int. Cl.[4] .............................................. H02P 5/40
[52] U.S. Cl. .................................. 318/798; 318/806; 318/807
[58] Field of Search ............... 318/798, 806, 803, 805, 318/807–811

[56] References Cited

U.S. PATENT DOCUMENTS

| 3,636,430 | 1/1972 | Kernick . |
| 3,648,150 | 3/1972 | Kernick . |
| 4,125,796 | 11/1978 | Nagase . |
| 4,451,771 | 5/1984 | Nagase . |
| 4,456,868 | 6/1984 | Yamamura . |
| 4,484,128 | 11/1984 | Jotten et al. ........................ 318/803 |
| 4,489,371 | 12/1984 | Kernick . |
| 4,677,360 | 6/1987 | Garces ................................. 318/803 |

OTHER PUBLICATIONS

"Field-Oriented Control of A Standard AC Motor Using Microprocessors" by R. Gabriel, W. Leonhard and C. J. Nordby; IEEE Trans. IA-16; pp. 186–192; Mar./Apr. 1980.
"Introduction to Field Orientation and High Performance AC Drives" by D. W. Novotny and R. D. Lorenz; IEEE Industry Applications Society; Oct. 6–7, 1985, Toronto, Canada, Section 2, pp. 2-1 to 2-65.
"Time Optimal Response Control of a Two-Pole Single-Phase Inverter" by M. A. Geyer and A. Kernick; Power cond. Spec. Conf., JPL, Pasadena, Calif., Apr. 19, 1971.
"Static Inverter With Synchronous Output Waveform Synthesized by Time-Optimal-Response Feedback" by A. Kernick, D. L. Stechschulte and D. W. Shireman; IEEE Trans.IECI-24-No. 4, Nov. 1977.
"High Performance Torque-Controlled Induction Motor Drives" by C. D. Schauder, F. H. Choo, M. T. Roberts, in IEEE Trans. IA-19-No. 3, May-Jun. 1983.

Primary Examiner—David Smith, Jr.
Attorney, Agent, or Firm—C. N. Lorin

[57] ABSTRACT

An inductio motor torque/flux control system the motor flux is forced down while accelerating and force up while decelerating to maintain a required flux level at all speeds. This is achieved through vectory control by generating a direct current component in relation to the flux demand while imposing limits thereto corresponding to the maximum desirable resultant current vector, and by generating a quadrature current component which is held between limits defined by the sum of the squres of the two current components. The three-phase currents of the motor generated by vector control transformation are used to control a voltage-source inverter in a bang-bang fashion. The conventional bang-bang technique is improved by tying up one pole while controlling in the bang-bang mode the two other poles. To this effect the motor back emf is detected when the poles are simultaneously tied to one of the DC link terminals, and the tied-up pole is selected by the emf so detected.

4 Claims, 16 Drawing Sheets

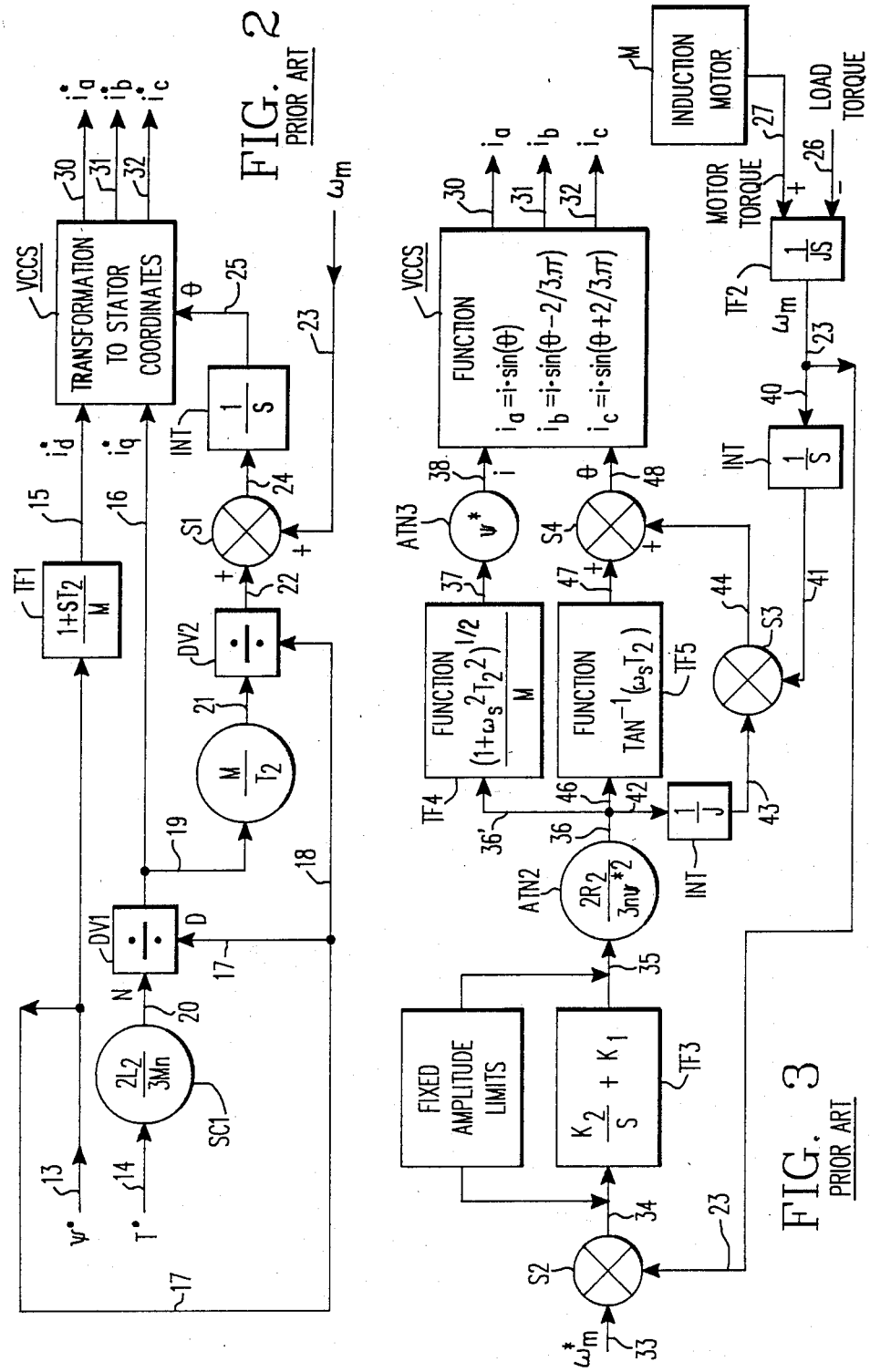

INDUCTION MOTOR TORQUE/FLUX CONTROL SYSTEM

TECHNICAL FIELD

The present invention relates to induction motor drives in general, and more particularly to an induction motor torque and flux system, and to current control apparatus for such system.

BACKGROUND OF THE INVENTION

Field-oriented control for an AC motor drive is well known. Based on a reference frame which rotates at the speed of the rotor flux, a flux component and a torque component of the stator currents oriented upon such reference frame are calculated and used to control the motor flux and the resulting torque. See for instance FIELD-ORIENTED CONTROL OF A STANDARD AC MOTOR USING MICROPROCESSORS by R. Gabriel, W. Leonard and C. J. Nordby, IEEE Trans. IA-16, pages 186–192, March/April 1980; INTRODUCTION TO FIELD ORIENTATION AND HIGH PERFORMANCE AC DRIVES by D. W. Novotny and R. D. Lorenz, IEEE Industry Applications Society, Oct. 6—6, 1985, Toronto, Canada, Section 2, pages 2-1 to 2-65. The two afore-cited publications are hereby incorporated by reference. The aforementioned W. Leonard and the D. W. Novotny and R. D. Lorenz publications are hereby incorporated by reference.

The assumption is that the motor flux $\psi^*$ and $T^*$ demand signals can be instantaneously satisfied under the further assumption that the mathematical model used is accurate, that the parameter T2, namely the rotor time constant, is known and that the specified direct and quadrature current components $i_d$ and $i_q$ can be instantaneously injected into the stator winding.

Direct and quadrature stator currents have been generated for control according to the vector control method described in U.S. Pat. No. 4,456,868 of Yamamura et al. The purpose, there, is to improve the response on the torque.

It is also known from U.S. Pat. No. 4,125,796 of Nagase et al. to generate a desired torque by calculating a current pattern signal, also by decomposing the motor current into a flux oriented direction and in quadrature thereto.

U.S. Pat. No. 4,451,771 of Nagase et al. discloses the generation of a current correction signal applied to the current control signal derived according to the motor control method in an AC motor drive.

The object of the present invention is to achieve a speed regulator providing dynamic control of both the motor speed and the magnetic flux level, thereby to ensure that control is maintained over the field-weakening operative range of the motor drive.

The present invention involves a speed regulator system wherein both the torque and flux references are variables. The torque demand is derived from the speed regulator error signal and the motor flux reference is a predefined function of the motor speed.

As long as in the motor drive, the flux is held constant, or merely gradually changing, the prior art technique of vector control can accommodate speed regulation. If, however, the speed is called to accelerate rapidly, or conversely, to decelerate rapidly, the problem arises of dynamically forcing the flux to match such circumstance. Since there are two variable current components, the problem translates itself into how to selectively exercise the compensating effect on those two components so as to cause the resultant vector to match the speed requirements. The major obstacle with such rapidly changing demand is to prevent the current from exceeding acceptable limits. Therefore, the question arises as to how the total current should be limited to a safe maximum value. Imposing constant limits on both components would unnecessarily restrict one component in magnitude whenever the demand for the other is low.

SUMMARY OF THE INVENTION

The invention relates to an AC induction motor drive including first means responsive to a flux demand for generating a first signal representative of a direct component reference current; second means responsive to a torque demand for generating a second signal representative of a quadrature component reference current; third means responsive to a speed demand for generating a third signal representative of a position angle characterizing the current resultant vector of said direct and quadrature components; and fourth means responsive to said first, second and third signals for generating three coordinate phase currents for the motor drive. According to the invention, means is provided within the first means for dynamically responding to the flux demand and first limiting means is provided in response to said dynamically responding means for limiting the first signal in magnitude within a predetermined maximum value (LIM). Second limiting means is provided responsive to the first signal and operative upon the second means for limiting the second signal so that the resultant vector remain within the value $ALIM = (LIM^2 - i_d^{*2})$, where $i_d^*$ is said first signal.

Preferably, a microcomputer is used to compute $ALIM = \sqrt{(LIM^2 - i_d^2)}$.

According to another aspect of the invention, poletying current control apparatus is provided with a voltage-source inverter generating the three-phase currents of the motor under a bang-bang technique, the operation of which is enhanced by control means operated cyclically upon two of said poles while connecting one phase of the motor to one of the voltage-source terminals through the third of the poles, the roles of said two and third poles being sequentially permutated during such cyclic operation.

BRIEF DESCRIPTION OF THE DRAWINGS

Preferred embodiments of the invention will now be described by way of example only, with reference to the accompanying drawings in which:

FIG. 2 shows in block diagram the concept of induction motor torque control using an impressed stator current vector as in the prior art;

FIG. 3 illustrates a prior art closed loop speed regulator system requiring constant flux operation;

DESCRIPTION OF THE PREFERRED EMBODIMENTS

Figure 1:
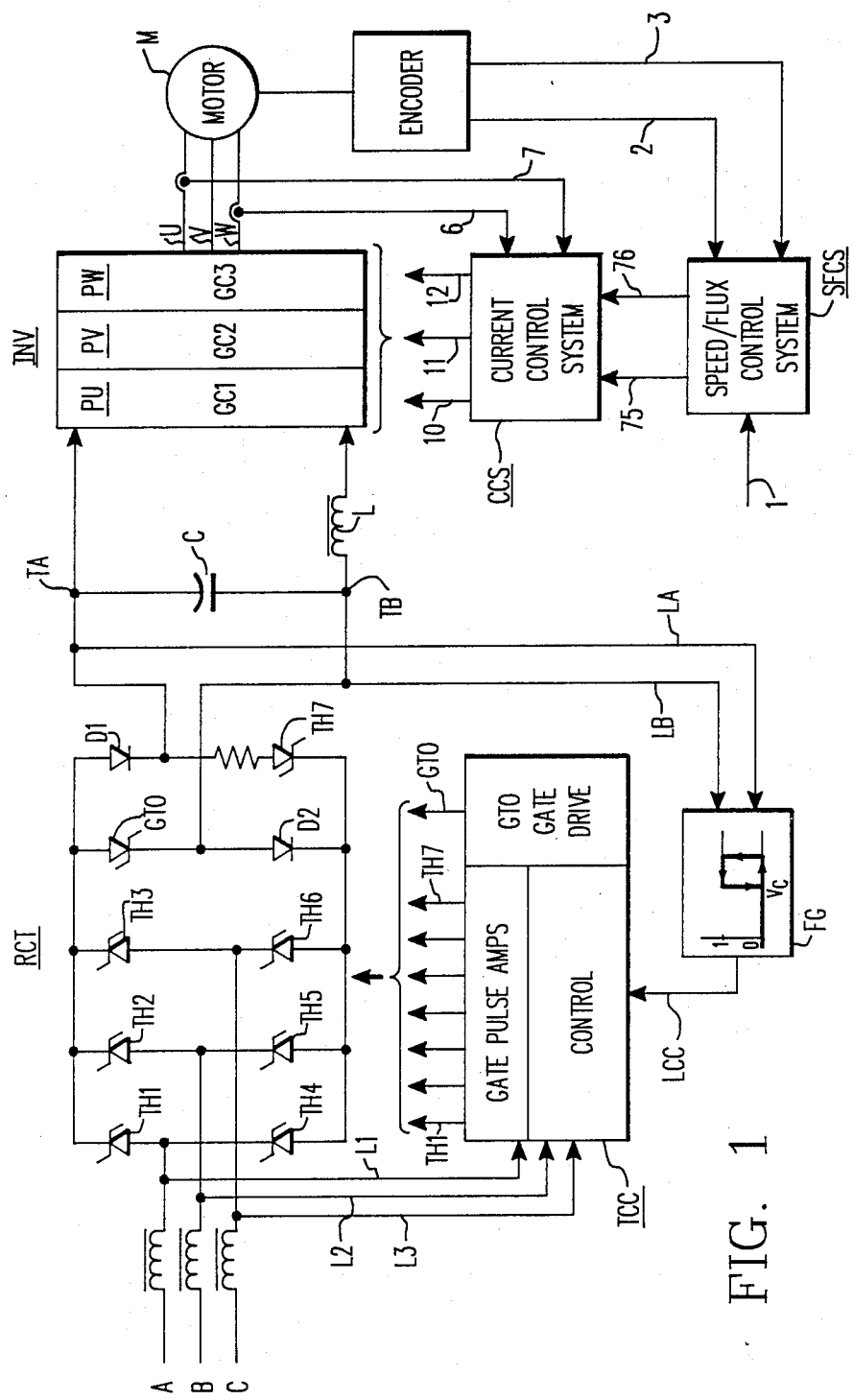
FIG. 1 is a block diagram representation of an AC motor drive embodying the speed/flux control system according to the present invention.

Referring to FIG. 1 a speed regulator system is shown embodying dynamic control according to the invention for both the motor speed and its magnetic flux level. As explained hereinafter, within the speed/flux control system SFCS the torque demand is derived from a speed regulator error signal, while the motor flux reference is obtained according to a predefined function of the motor speed. Both the torque and flux references are used as variables, as explained hereinafter.

In the illustrated voltage source inverter and variable frequency AC motor drive of FIG. 1, the rectifier RCT includes a combination of a GTO device and a thyristor TH7 to ensure the passing of regenerative energy from the inverter side, while providing a zero-current intermediate stage in the commutation process and maintaining maximum voltage on the DC-link capacitor C between successive such zero-current stages. This two-quadrant power conversion aspect of a voltage-source inverter motor drive has been described in U.S. Pat. No. 4,697,131 of Colin D. Schauder. For the purpose of the description of this aspect of FIG. 1, the Colin D. Schauder patent is hereby incorporated by reference.

Thus, from the three-phase AC industrial lines A, B, C, a rectifier RCT provides, with a capacitor C, a DC-link voltage between DC terminals TA, TB. The voltage source so designed includes a reactor L (as generally known) and the DC voltage is converted by an inverter INV into a three-phase AC power supply (U, V, W) for the AC motor M (as generally known). The rectifier includes a thyristor bridge (TH1–TH6) and two serially-connected networks, one having a nodal point connected to the negative terminal TB and situated between a GTO device and a device D2, the latter across the RCT bridge, the second having a nodal point connected to the positive terminal TA and situated between a diode D1 and a thyristor TH7, the latter across the RCT bridge. This is as described in the incorporated by reference patent.

A thyristor control circuit TCC responding to the AC phase voltages derived on lines L1, L2, L3 and to a power flow direction control signal applied on line $L_{cc}$, is generating gating signals for thyristors TH1–TH7 and the GTO device. Depending upon whether the motor drive is in the forward mode, or in the regenerative mode, the signal of line $L_{cc}$ is a Zero, or a ONE, as outputted by a function generator FG responding to the value of the voltage $V_c$ exiting across terminals TA, TB, as derived between lines LA and LB.

As explained hereinafter, the invention provides for a speed/flux control system SFCS responding to a speed reference on line 1 and to the actual speed of the motor as sensed between lines 2 and 3 from an encoder ("type H25/encoder BEI") coupled to the stator and the rotor of the motor. Two phase representative currents (ia, ic) are generated on lines 75 and 76 by the speed/flux control system SFCS and are used by a current control system CCS to provide control signals on lines 10, 11, 12, in relation to the currents sensed on lines 6 and 7 on phases V and W of the stator of the motor, so as to control a voltage-source inverter INV. As explained hereinafter, the bang-bang technique is used by the current control system CCS, preferably with the improvement according to another aspect of the present invention consisting in cyclically tying one of the three poles PU, PV, PW of the inverter, while controlling the two others, via their corresponding gating circuits (GC1, GC2, GC3). This aspect of the invention will be explained hereinafter.

Referring to FIG. 2, a block diagram illustrates the concept of vector control in an AC motor drive. The reference signal representing the flux demand $\psi^*$ is applied by line 13 to a transfer function TF1 [function $(1+St2/M)$] providing on line 15 the direct component $i_d^*$ of the current. The reference signal representing the torque demand $T^*$ is applied by line 14, first to a scaling circuit SC1 accounting for the constant 2L2/3M n (where L2 is the three-phase rotor self-inductance, M the three-phase stator/rotor mutual inductance and n the number of pole pairs on the machine), then, to a divider DV1 having the output of line 20 from a scaler circuit SC1 (2L2/3Mn) applied as numerator and the flux demand derived from line 13 applied, thereto by line 17, as the denominator. The result is on line 16 the quadrature component $i_q$ of the current. From this two coordinate system, the vector current control system VCCS converts the system into a three current system (ia, ib, ic, on lines 30, 31, 32, respectively) by reference to the direct and quadrature components resultant vector angle $\theta$ derived on line 25. Angle $\theta$ is obtained as follows: A speed angular velocity $\omega_\mu$ is derived on line 23 from the motor; from the quadrature component $i_q^*$ of lines 19 and 19, after scaling by M/T$_2$ (where $T_2 = L_2/R_2$, with L$_2$ being the rotor inductance and R$_2$ the rotor resistance per-phase) and, after adjustment by taking a correction with the inverse of the flux demand $\psi^*$ (via divider DV2), a speed demand is derived on line 22. The latter is then added (at S1) to the actual speed of line 23 so as to provide at the output a value which is integrated (by 1/s within integrator INT) to convert the speed into a position angle $\theta$ on line 25. From the resultant vector defined by orthogonal components $i_d^*$ and $i_q^*$ (on lines 15, 16) and from the resultant vector angular position $\theta$ (on line 25), are obtained, as generally known, the three-coordinate currents ia, ib, ic of lines 30, 31, 32.

The problem arises as to how the total current should be limited to a safe maximum value. Imposing constant limits on both components would unnecessarily restrict one component in magnitude whenever the demand for the other is low. According to the present invention the resultant vector current in the motor is limited by establishing the flux-demand by priority over the torque-demand. Up to a limit value ($\pm$LIM) flux control is prevailing, thereby ensuring optimum use of the current available from the power source. To this effect, the instantaneous direct component of the current $i_d$ is estimated within its normal limit values ($\pm$LIM) and a limit ($\pm$ALIM) is established for the quadrature component of the current $i_q$ so as not to exceed the assigned $i_d$ limit (LIM). The quadrature current component limit ALIM is calculated in accordance with the formula:

$$\text{ALIM} = \sqrt{\text{LIM}^2 - i_d^2}$$

considering that the square of the resultant vector is equal to the sum of the square of its components. As a result, no current is allocated to torque production unless the motor flux has reached the value prescribed for each speed.

The direct current $i_d$ could contain large noise components due to the time derivative of a quantized flux demand derived from a look-up table, for example. As a precautionary measure, according to the invention low-pass filter action is provided introducing a time lag between the flux demand and the actual flux in the machine, and also adapted speed regulation is provided with increased loop gain or decreasing flux, and conversely.

Referring to FIG. 3, a block diagram illustrates a speed/torque control system for induction motor expressed in polar coordinates drive and operating under constant flux demand. The reference speed $W_m^*$, applied on line 33, is compared by subtractor S2 with the actual mechanical speed $W_m$ derived on line 23, thereby obtaining on line 34 a speed error. The actual frequency $W_m$ of line 23 is obtained from the motor torque (line 27) and the load torque (line 26) to generate an error passed into a transfer function TF2 involving integration with the motor inertia J, as generally known. The speed error of line 34 is passed into a proportional (K1) and integral (K2/S) circuit (TF3) providing on line 35 the torque demand T* necessary to reduce the speed error. In order to ensure that the outputted torque demand is correctly limited and that the integral within TF3 is similarly limited, imposed in relation to both the input of line 34 and the output of line 35, as generally known. The torque demand of line 35 is scaled by a circuit SC2 involving the formula 2R2/3n $\psi^{*2}$, where R2 is the rotor resistance, n is the number of pole pairs, and $\psi^*$ the constant flux demand in this instance. The result is (on line 36) the slip frequency Ws. Two transfer functions TF4 and TF5 are used in response to line 36 in order to provide, under polar coordinates, the current vector i on line 38 and the vector angle $\theta$ on line 48, which are converted by a vector current control system VCCS into currents: $i_a = i.\sin(\theta)$; $i_b = i\sin(\theta - 2\pi/3)$ and $i_c = i.\sin(\theta + 2\pi/3)$ for the three phases U, V, W of the motor supply. Transfer function block TF4 involves the function $(1 + W_s^2 T_2^2)^{\frac{1}{2}} \times Y_m$, where T2 is the L2/T2 rotor time constant, with L2 being the rotor inductance, and M the mutual inductance between rotor and stator. Transfer function block TF5 involves the arc tangent $\text{TAN}^{-1}\leftarrow(\omega_s T_2)$. The angle $\theta$ is obtainedly, first integrating the signal of lines 36 and 42 to provide on line 43 a demand angle, and by integrating the signal of lines 23 and 40 (which is the actual $W_m$ signal) thereby obtaining by integration $\theta_m$. Then, a summer S3 combines the angles of lines 43 and 41 to provide on line 44 a corrective angle for the output (on line 47) from transfer function TF5, via summer S4. All this is generally known, and is provided only to illustrate the prior art.

Figure 4:
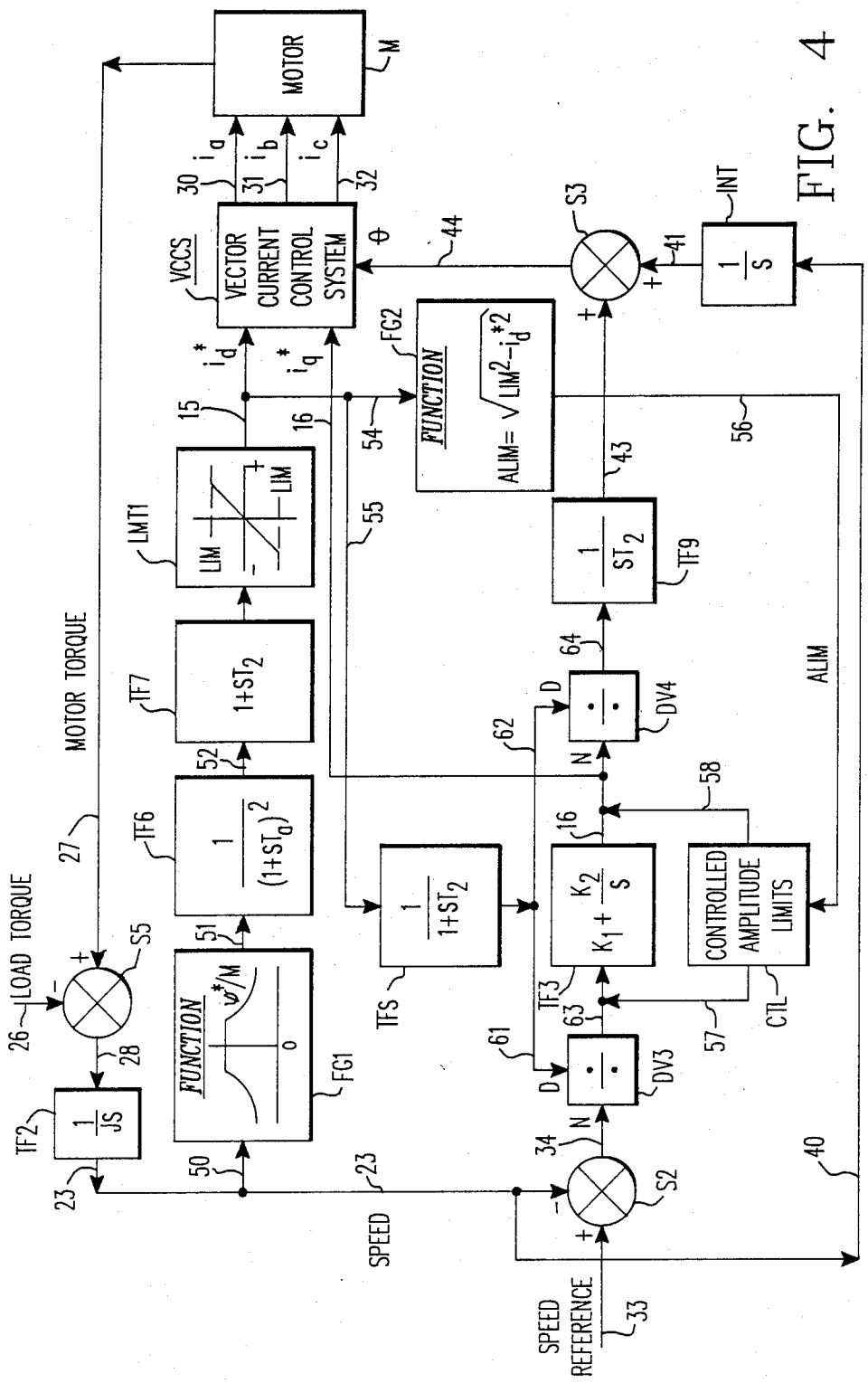
FIG. 4 is a block diagram of the speed/torque control system embodying forced flux level control according to the present invention.

Referring to FIG. 4, a speed regulator system implementing controlled flux-forcing according to the present invention is illustratively shown.

FIG. 4 shows, like in FIG. 3, the generation of a speed error (on line 34), the generation of a speed signal (on line 23) obtained from a motor torque signal (line 27) and a load torque signal (line 26), and the generation of a vector angle $\theta$ (on line 44). However, instead of generating a polar coordinate vector current i (as in line 38 of FIG. 3), direct and quadrature current components $i_d^*$ and $i_q^*$ are generated on lines 15 and 16, like in FIG. 2.

In principle, the torque produced by an induction motor and the magnetic flux level in the machine can both be controlled dynamically by correctly controlling the stator current vector and its instantaneous slip frequency relative to the rotor. FIG. 2 shows the relationships which must be preserved in order for the instantaneous torque demand T*, and the instantaneous flux demand $\psi^*$, to be satisfied. In this diagram, the components $i_d^*$ and $i_q^*$ represent the stator current vector in a reference frame at angle $\theta$ relative to the stator, and $T_2$ is the rotor time constant.

When a motor drive application requires constant flux operation (i.e. $\psi^*$ constant) this control concept can readily be used to configure a closed loop speed regulator system as shown in FIG. 3. In such a case all gain terms are constant and the speed control bandwidth applied to TF3 stays constant at all operating speeds. The motor phase current can be limited by simply placing fixed amplitude limits on the compensated speed error signal, as shown in relation to block TF3.

However, for some applications it is necessary to control the motor flux level dynamically. Under constant horsepower operation, for example, the motor flux must be forced-down while accelerating and forced up again while decelerating, in order to ensure that a prescribed flux level is achieved at each speed. If this is not done, it may not be possible to meet the operating specifications continuously under the available supply voltage. FIG. 2 shows that when $\psi^*$ varies with time, the direct current component $i_d$ must contain terms proportional to both $\psi^*$ and its rate of change.

The speed signal of line 23, by line 50 and function generator FG1, is converted into a flux demand representative signal, the function being $\psi^*/M$ for both directions of rotation. Function generator FG1 defines a speed range for which the flux demand $\psi^*$ is constant. Outside the range on either side thereof, depending upon whether the speed is positive (forward), or negative (reverse), the flux demand is forced down as the speed exceeds what can be called the "base speed" of the motor drive, and conversely is forced back to the constant flux level if the speed is decreasing toward "base speed". The invention comes into play in these two instances: by i on the one hand allowing the direct current component $i_d^*$ to provide the necessary flux within the assigned limits ±LIM, and on the other hand by 2) controlling the quadrature component $i_q^*$ within limits and within the capability to exert torque controls with the quadrature component after the priority has been given to the direct component. The outputted signal of line 51 is only an ideal value. The latter is converted into an actual value by a transfer function TF6 taking into account the time lag and introducing a time constant Ta through a formula $1/(1+sT_a)^2$. The flux demand $\psi^*$ on line 52 is then passed into a proportional-plus-differential transfer function $(1+sT_2)$ within block TF7. The outputted current signal (on line 53) is only ideal and needs to be maintained within practical limits LIM as shown by the limiter LMT1 of FIG. 4.

According to the present invention where $i_d$ and $i_q$ are variables, each calling for a resultant current required to be held between acceptable limits. It is now proposed to treat the direct component $i_d$ independently as a variable to be held between own limits ±LIM which match the limits imposed to the resultant current vector, but independently of the resultant current vector, thereby forcing the flux from line 15 to conform the required values within the function of FG1 for the particular speed.

Having established the instantaneous value of $i_d$, the value of $i_d$ is used to instantaneously and continuously calculate which limits can be imposed to the quadrature component $i_q$ so that, while maximizing the use of $i_d$, the resultant current vector, nevertheless, will not exceed its imposed limit. This is achieved from the consideration that the sum of the squares of the direct and quadrature components of current is equal to the square of the resultant vector. Accordingly, the limit to be imposed to the quadrature current ALIM is such that ALIM=$\sqrt{LIM^2-i_d^2}$. In other words, while $i_d$ is allowed to be maximized within the limits ±LIM assigned to the resultant vector, the limit ALIM can be imposed to the quardature component, thereby never to exceed the limit LIM for the resultant current vector. As shown in FIG. 4, this is achieved with function generator FG2 responsive to the signal of line 15, and line 54, thereby providing (on line 56) the variable limit ±ALIM to be applied to controller CTL applying by lines 57, 58 to the (P+I) controller TF3 of line 63 to line 16, a window of variable width, in contrast to the fixed amplitude limits applied to block TF3 of FIG. 3. The resulting signal is on line 16 the quadrature component $i_q^*$ which, with the direct component $i_d$ of line 15, determines the current control signals of lines 30, 31, 32. The resultant vector angle $\theta$ is obtained on line 44. To this effect from line 16 is supplied the numerator of a divider DV4 having the output of a function $1/(1+sT_2)$ defined within a transfer function TF8 (responsive to line 15) as its denominator. An integrator (TF9) embodying a function $1/sT_2$ is used to convert the signal of line 64 outputted by divider DV4, which is a speed signal, into a position (on line 43) angle signal to be added by summer S3 to the actual position angle derived from line 23, via line 40 and integrator INT, and obtained on line 41. Therefore, line 44 (at the output of summer S3) is the frame angle $\theta$ enabling the conversion (by the vector current control system VCCS) of $i_d^*$ and $i_q^*$ into phase currents $i_a$, $i_b$, $i_c$. In other words, the direct component $i_d$ has been given priority over the quadrature component $i_q$, thereby establishing "flux dominance" in the speed controller. This means that no current is allowed to torque production ($i_q^*$ of line 16) until the motor flux has reached the prescribed value for each speed according to function FG1.

Should there be no load torque, there will be a self-limiting effect on $i_d$ since reducing motor torque reduces the derivative term in $i_d$. In practice, $i_d$ should never reach its allowable limits, and the drive will accelerate, or decelerate, at an optimum rate which is compatible with the prescribed flux characteristic (in FG1), the inertia (J), and the set current limit (LIM). When the drive is loaded, the situation is similar except that $i_d$, now, conceivably can be driven into limit by the accelerating, or decelerating, action of a load torque. This would be analogous to a loss of control and the drive being stalled by excessive load torque, which would not occur if the load characteristics had been correctly anticipated.

It is recognized that for certain applications it might be difficult to implement the $(1+sT_2)$ transfer function TF7 required for flux control. In such a case some low-pass filter action will be provided. A filter transfer function H(s) will be chosen to represent an acceptable time lag between the flux demand and the actual flux in the machine. However, thanks to the invention, such time lag can be made much shorter than the $T_2$ time constant which would prevail if no flux forcing was attempted. It will also be chosen to meet a tolerable noise level. Typically where the rotor time constant is $T_2$=458 msec, (considering TFG as two cascaded first order lag filters, in the instance of each having a 10 msec time constant), H(s) can be chosen to be two real poles at s=−100.

In the proposed control system, the actual motor flux level is calculated from the demanded value of $i_d$ and the resulting signal controls the gain of the speed regulator loop. Since the gain would otewise vary in proportion to the actual flux, the action of such adaptive control is to increase the loop gain for decreasing flux and vice versa. The regulator is tuned to operate under full flux conditions below base speed. It should, then, have constant small signal bandwidth at all speeds. Should the increased gain associated with low flux increase the noise level propagated from the speed feedback transducer, the path will be adequately filtered.

Figure 5:
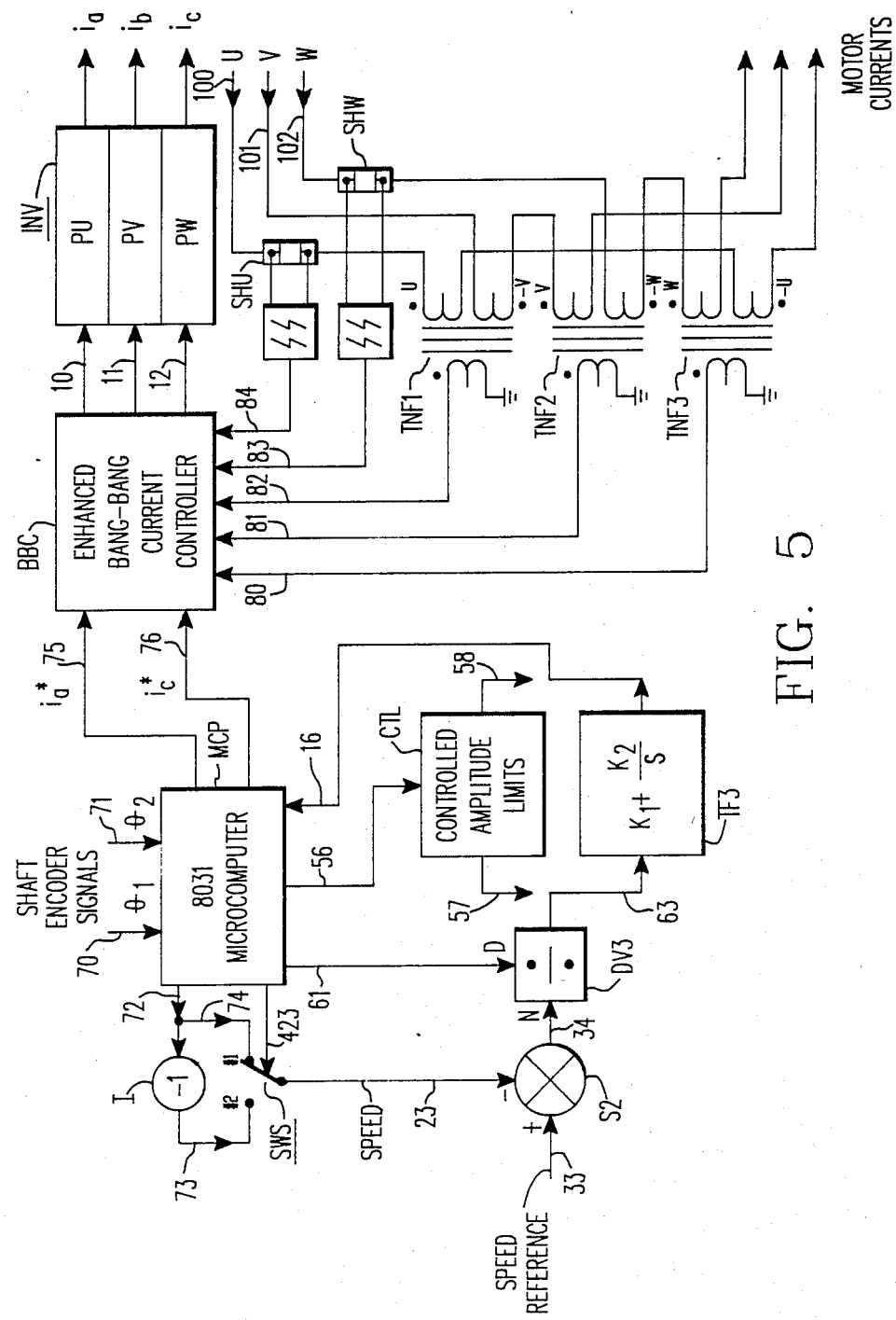
FIG. 5 shows the drive control system which is a preferred implementation in the speed/torque control system of FIG. 4.

Referring to FIG. 5, the drive control system according to the invention is shown to use a computer MCP (in this instance an INTEL microcomputer 8031) for performing many of the functions disclosed in analog form in FIG. 4. Thus, the ALIM function of FG2 is performed by the computer and supplied by line 56 to the controller CTL. The $i_q^*$ quadrature component of line 16 is supplied to the computer, the $i_d^*$ draft component being generated within the computer. The computer responds on lines 70 and 71 to two shaft encoder signals $\theta$1 and $\theta$2, which the computer uses as generally known to provide the signal $\theta$ of line 44 in FIG. 4. The computer generates the actual speed signal on line 72 which, depending upon the sense of rotation (forward, or reverse), by switch SWS, and as controlled by the computer, will cause on line 23 the speed signal to be applied to summer S2, like in FIG. 4. The computer also generates the signals of lines 61 and 56 (like in FIG. 4). Accordingly, are outputted current reference signals $i_a^*$ and $i_c^*$ on lines 75, 76, respectively. The third phase current signal $i_b^*$ being obviously: $-(i_a^*+i_b^*)$.

According to a second aspect of the invention, and as shown in FIG. 5, a bang-bang current controller BBC is used, in response to the reference signals of lines 75, 76, to apply by lines 10, 11, 12 (like in FIG. 1) control signals for the gating circuits GC1, GC2, GC3 of the respective inverter poles PU, PV and PW.

The bang-bang method of controlling an inverter is generally known. See for instance A. Kernick, D. T. Stechschulte and D. W. Shireman/"Static Inverter With Synchronous Output Waveform Synthesized by Time-Optimal-Response Feedback" in IEEE Transactions IECI Vol. 24, No. 4, November 1977, pages 297–305; also, "Time-Optimal Response Control of Two-Pole Single-Phase Inverter/M. A. Geyer and A. Kernick/Power Cond. Spec. Conf. JPL, Pasadenia, Calif., Apr. 19, 1971; and, "High Performance Torque-Controlled Induction Motor Drives/C. A. Schauder, F. M. Choo, M. T. Roberts in IEEE Trans. IA-19, No. 3, May-June 1983. The bang-bang technique used here calls for a measurement of the motor currents where shunts SHU, SHV for two of the phases (U, V) provide on lines 83 and 84 the sensed current signals. The motor currents on lines 100, 101, 102 are passed into three transformers TNF1, TNF2, TNF3 providing in the primary the difference between two consecutive currents. Thus TNF1 receives the difference between $i_a$ of line 100 and $i_b$ of line 101. Transformer TNF1 generates at its secondary the rate of change $d(i_a - i_b)dt$, mainly on line 82. Similarly, TNF2 provides on line 81 the rate of change $d(i_b - i_c)dt$, and TNF3 provides on line 80 the rate of change $d(i_c - i_a)dt$. Circuit BBC generates on lines 10, 11, 12 (like in FIG. 1) control signals for the gating circuits (GC1, GC2, GC3) of the three poles PU, PV, PW of the inverter, respectively.

How the bang-bang current controller BBC, according to the invention, has been provided with enhanced capability will be explained hereinafter by reference to FIGS. 12 and 15. The speed regulator according to the invention will be first described in its best mode of operation by reference to FIGS. 5, 6 and 7.

Figure 6A:
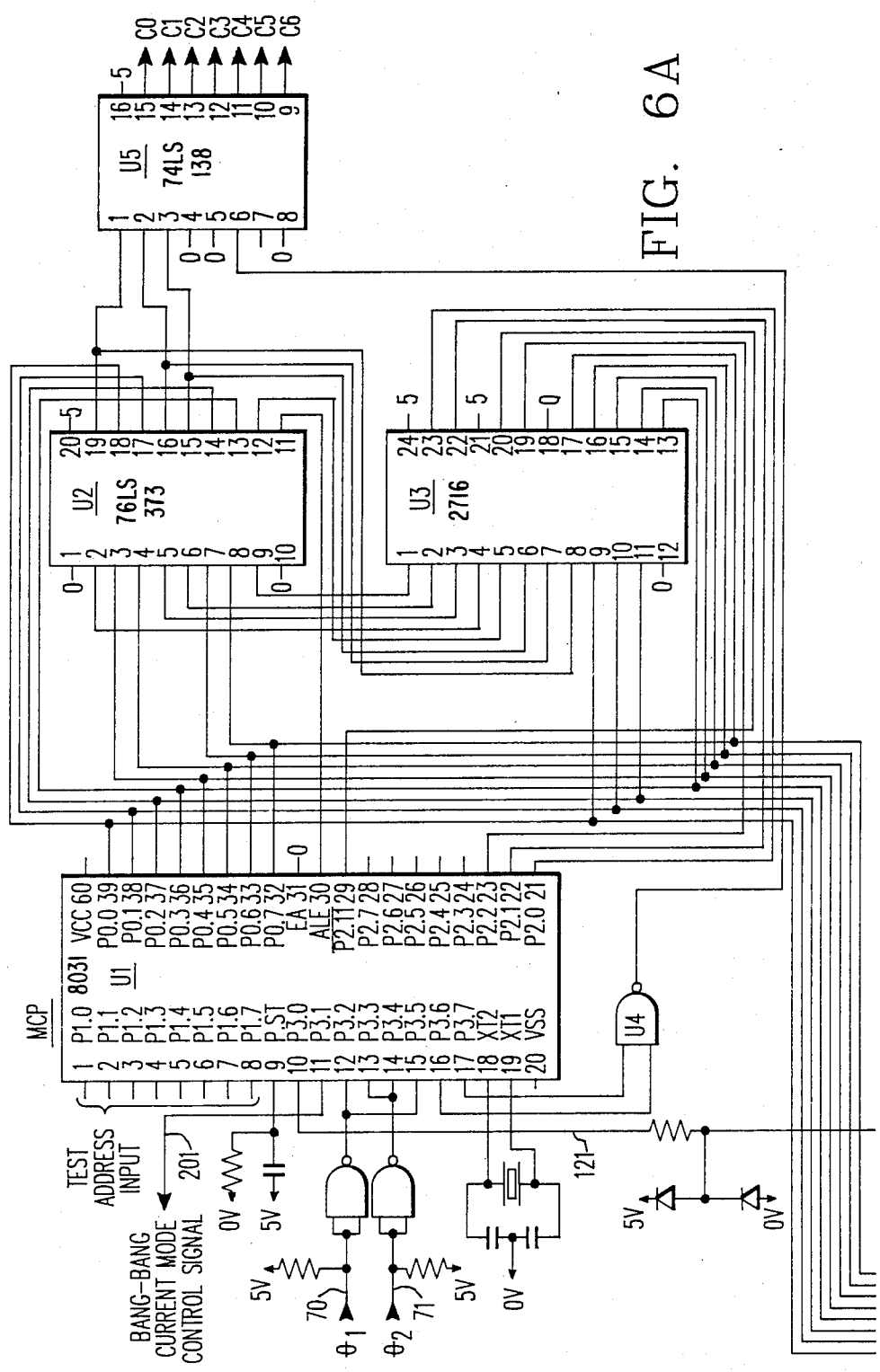
FIG. 6 is a hardware representation of the speed regulator in the system of FIG. 5.
Figure 6B:
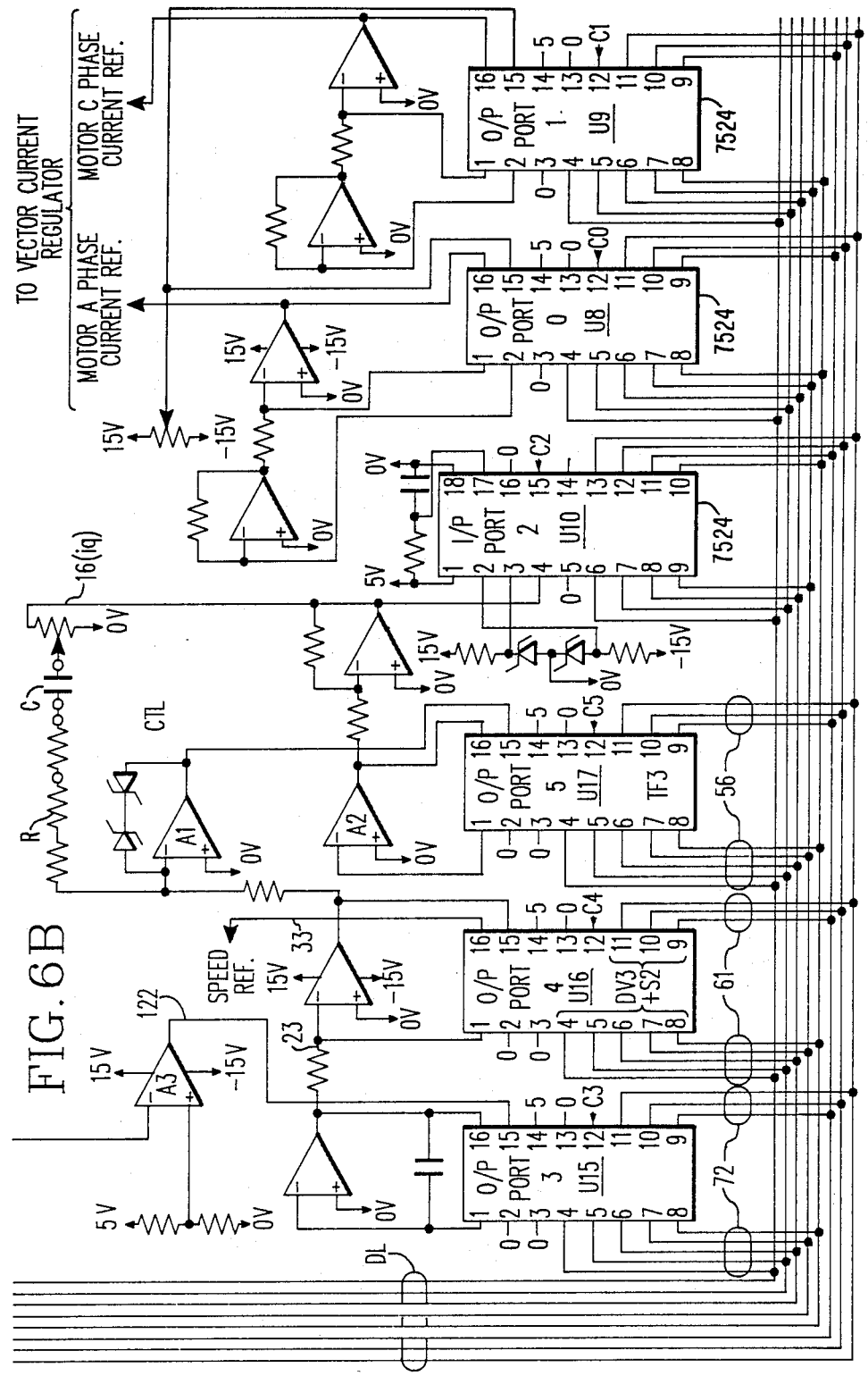

FIGS. 6A and 6B show the computer MCP of FIG. 5 connected by 8-bit data lines (DL) which are interconnected through ports #1 (solid state device U9); #0 (U8); #2 (U10); #5 (U17); #4 (U16) and #3 (U15), as seen from right to left in the drawing. The microcomputer MCP is an INTEL 8031. Chips U9, U8, U10, U17, U16 and U15 are of the 7524 type. Associated with the computer are an address latch U2, its decoder U5, and a PROM memory U3.

Ports #0 and #1 output on pins 16, and lines 75 and 76, the current references $i_a^*$ and $i_c^*$, respectively. Port #2 includes an A/D converter outputting, on pin 4 and line 16, the quadrature component signal $i_q^*$. At port #5 are received the 8 bits from the data lines DL relating to line 56 of FIG. 5 (pins 4 to 11 of V17). Chip U17 involves the function TF3. To it are associated amplifiers A1 and A2 which concur in accomplishing the speed regulator gain adjustment and the function of controller CTL.

Port #4 receives the 8-bit lines 61 from the data lines DL (pins 4 to 11 of U16). The functions of summer S2 and divider DV3 are performed by chip U16, in relation to the speed reference of line 33 (received on pin 16) and the actual speed of line 23 (on pin 1).

At port #3, the data lines DL (at 72) provides (pin 4-11) the speed modulus, and the speed polarity is accounted for by lines 121, 122 from the computer (polarity determination at A3) in accordance with pin 10 of solid state device U1 (MCP). The speed feedback signal appears on line 23.

Figure 7:
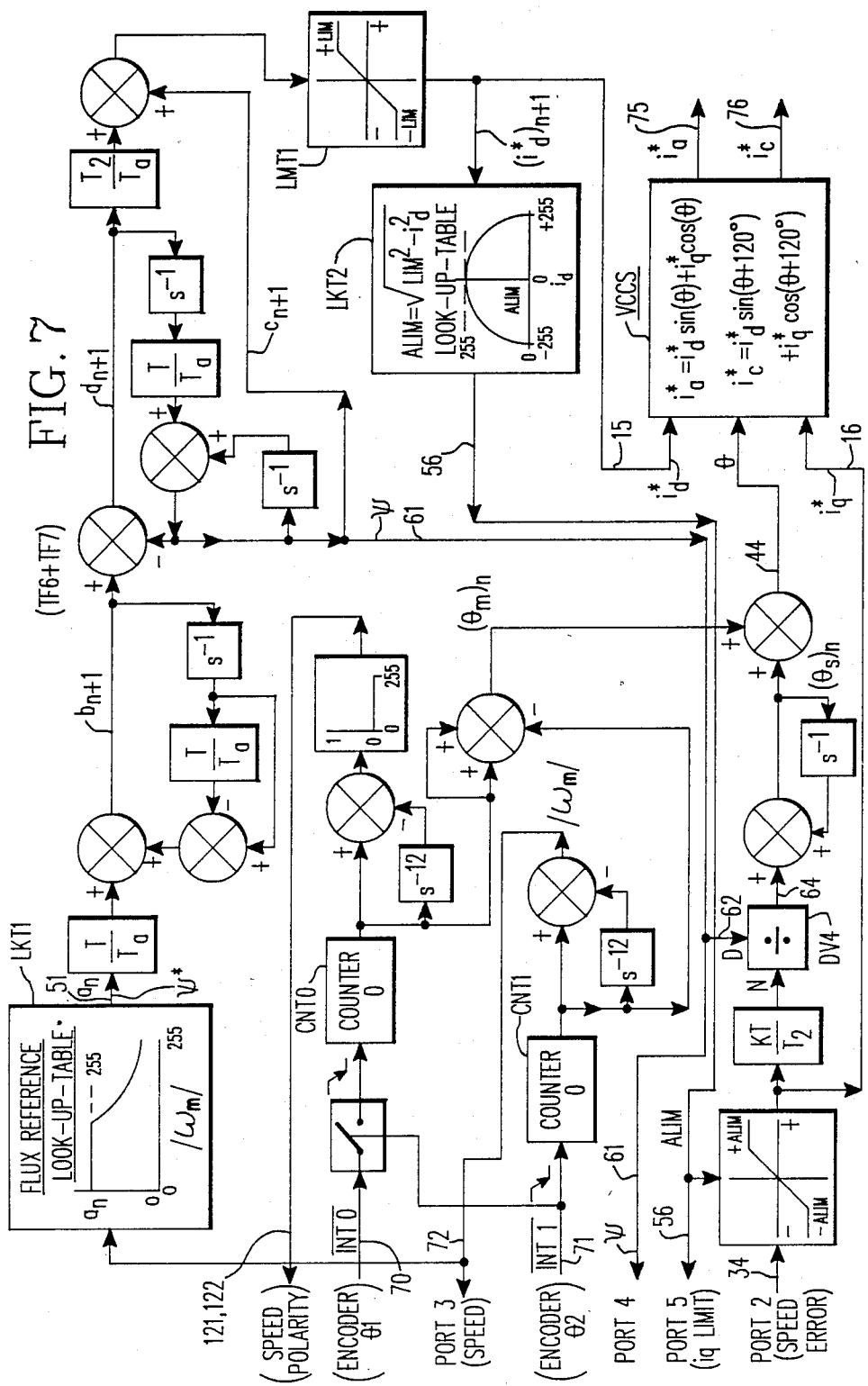
FIG. 7 is a schematic representation of the control software used in the speed/torque control system of FIG. 4.
Figure 8A:
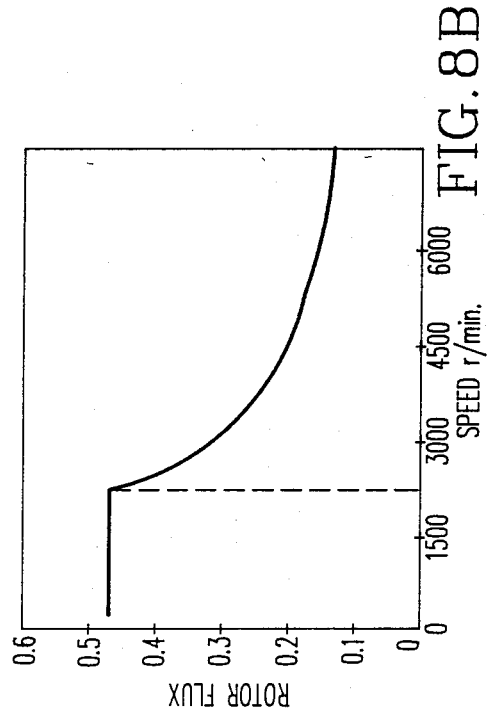
FIGS. 8A–8D are the power, rotor flux, torque/speed and voltage pkph/speed motor drive characteristics, respectively, for steady-state maximum power with the speed/torque control system of the invention.
Figure 8B:
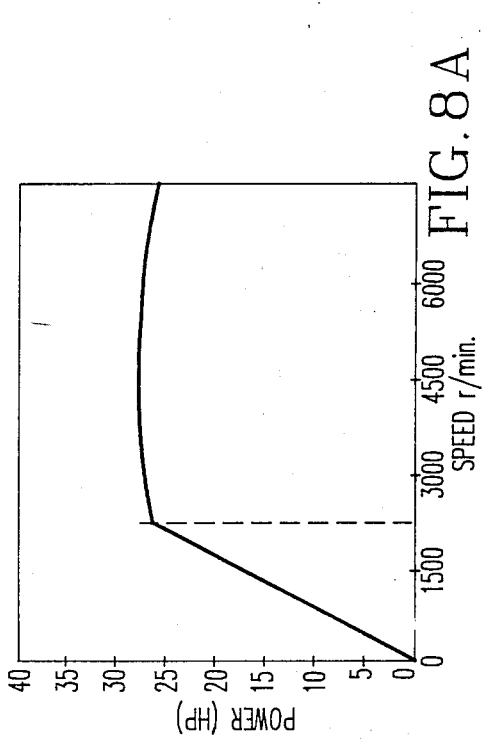
Figure 8C:
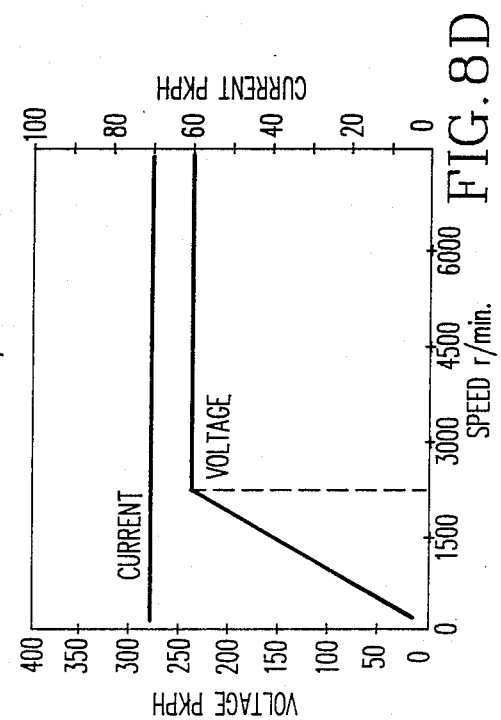
Figure 8D:
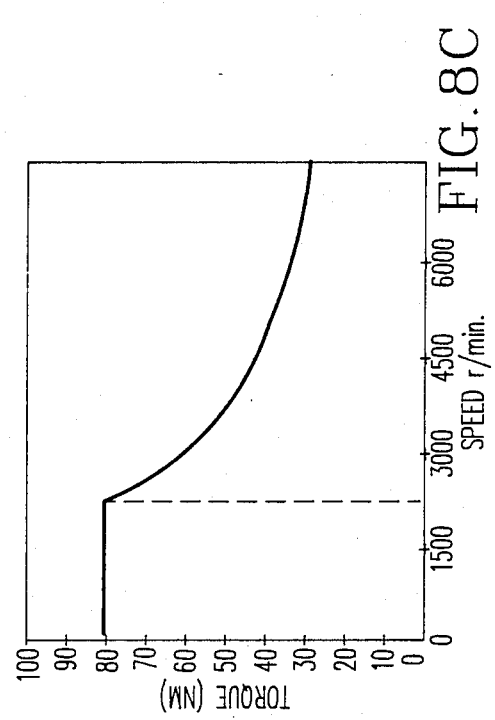

FIG. 7 is a software rendition of FIG. 4 where the lead lines and blocks are matching with their numeral references the corresponding ones of FIG. 4. In addition have been added in block diagram the software implementation of function FG1 with 1) a look-up table LKT1 outputting the flux demand required for the speed of line 72; and 2) symbolic representations of functions TF6 and TF7, leading to the limiter LMT1, then, to the ALIM calculator, the latter using another look-up table LKT2. The derivation of $W_m$ with the encoded values $\theta1$ and $\theta2$ is illustrated with counters CNT0 and CNT1.

More generally, FIG. 7 is readily understood in the light of FIG. 4, for the derivation of $i_d^*$ on line 15, of $i_q^*$ on line 16, of $\theta$ on line 44, and of $i_a^*$ and $i_c^*$ on lines 75, 76 at the output of the vector current control system VCCS.

In FIG. 7, T represents the sample time (350 $\mu$s), $T_a$ is the filter time constant (10 $\mu$s), K is the number of encoder counts per electrical radian (256/2$\pi$), and Q is a preset scaling constant which is the ratio between the maximum current (LIM) and the steady-state value of $i_d$ below base speed. The on-board counters of the 8031 computer simplify the derivation of the shaft position, the speed and the direction of rotation. The speed measurement is essentially done by pulse counting to give an 8-bit representation of the top speed modulus value.

Using a 12-MHz crystal, the 8031 computer performs the algorithm in 350 $\mu$s. This time is acceptable although a shorter execution time can be sought. At 240 Hz, which is the envisaged top or brake speed, the system outputs about 12 samples per cycle. Typically, the computer software has been written in ASM51 Assembler language, a way which is efficient in terms of execution time. The program listing is included hereinafter in Appendix A.

FIGS. 8A, 8B, 8C, 8D show curves at steady state (base speed) giving the maximum power characteristics for power (FIG. 8A), rotor flux (FIG. 8B), torque/speed (FIG. 8C) and voltage/speed (FIG. 8D) in an AC motor drive not using the invention.

Figure 9B:
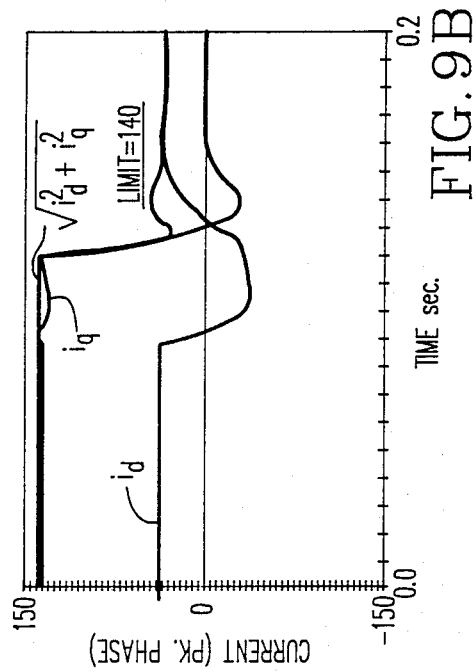
FIGS. 9A–9D are simulated characteristics for the torque, the current, the speed and the voltage, respectively, for an induction motor drive under the flux-dominant speed/torque control system of the invention, when accelerating through base speed.
Figure 9D:
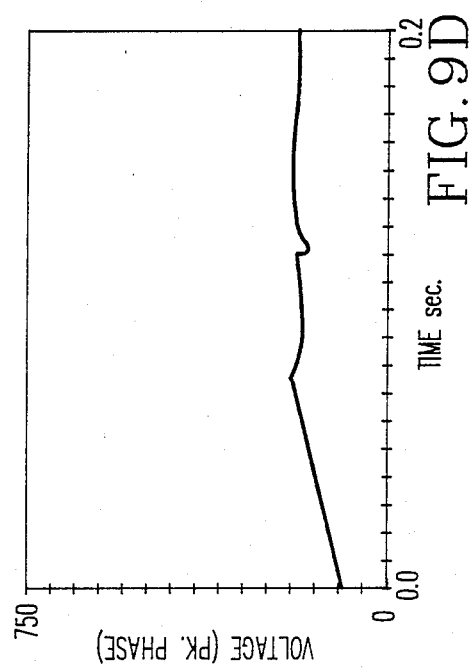
Figure 9A:
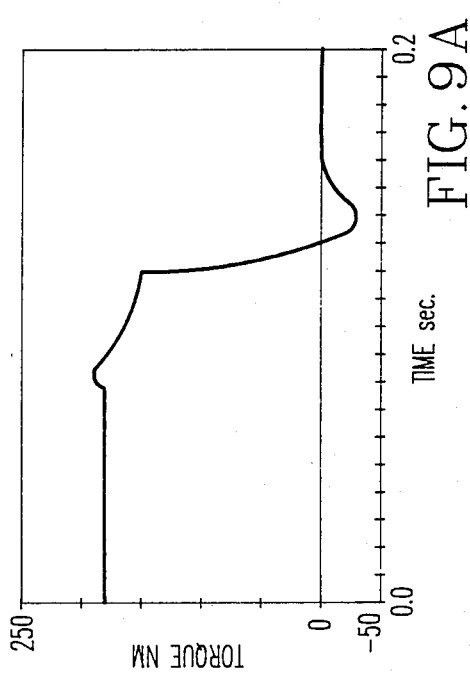
Figure 9C:
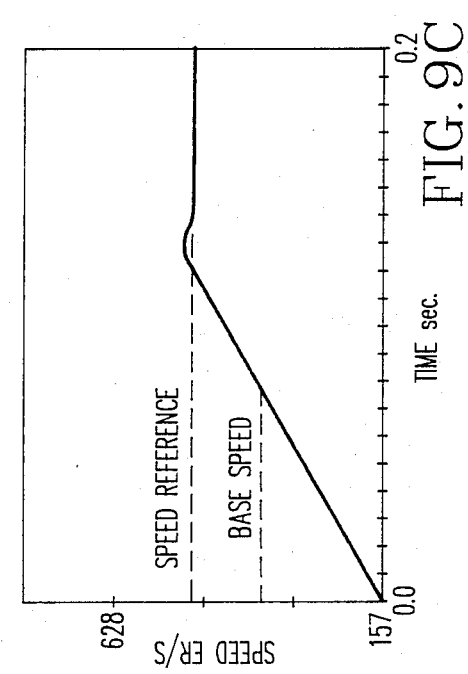
Figure 10A:
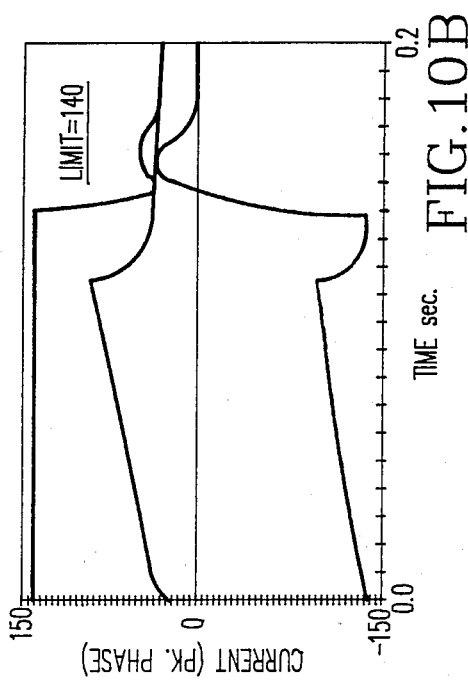
FIGS. 10A–10D are simulated characteristics for the torque, the current, the speed and the voltage, respectively, for an induction motor drive under the flux dominant speed/torque control system of the invention, when decelerating through base speed.
Figure 10B:
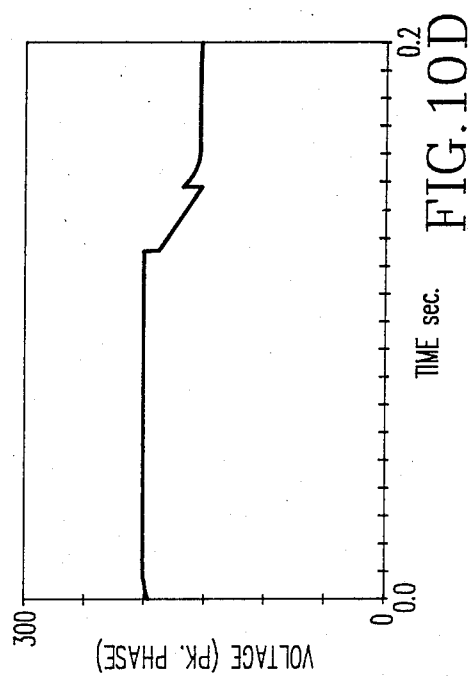
Figure 10C:
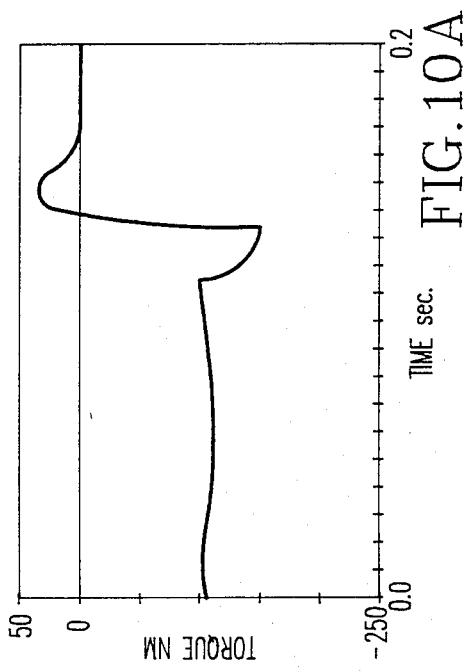
Figure 10D:
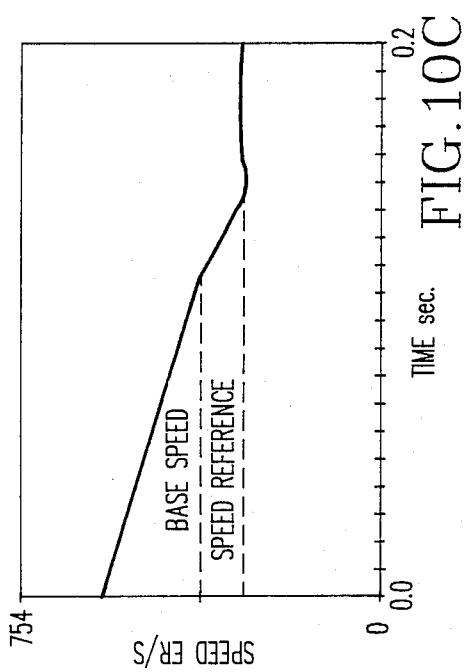

FIGS. 9A–9D show the effect of flux-dominant speed/torque control according to the invention when accelerating through base speed. FIG. 9A gives the torque, FIG. 9B the current, FIG. 9C the speed and FIG. 9D the voltage. FIGS. 10A–10D are like FIGS. 9A–9D when decelerating through base speed.

Figure 11:
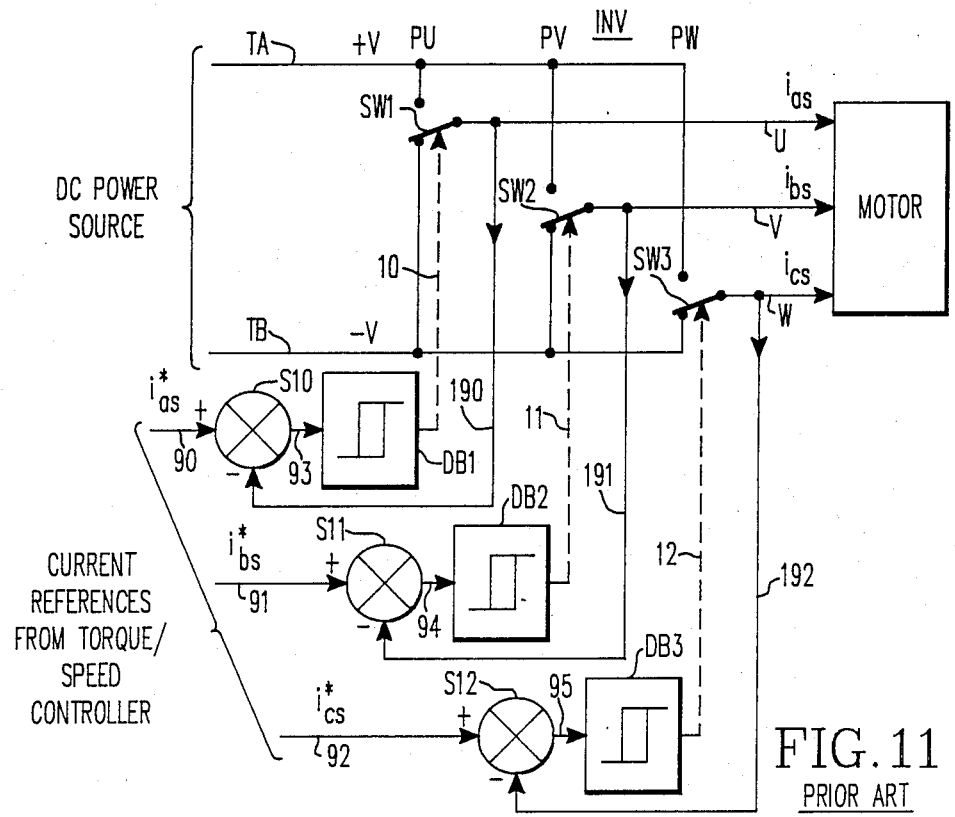
FIG. 11 shows a bang-bang current-control scheme as can be applied for current control in the speed/flux control system according to the invention.

FIG. 11 shows a conventional bang-bang current-control system. Between the DC-link line terminals TA, TB and the three phase line inputs U, V, W of the motor is connected an inverter INV with its three poles PU, PV, PW. PWM modulation is obtained by controlling the inverter switches per pole. The inverter switch operation in relation to terminals TA, TB is symbolized by switches SW1, SW2, SW3 for the respective poles, controlled at a certain high frequency in accordance with the control signals of deadband comparators DB1, DB2, DB3 (for the respective switches and poles). The phase currents are sensed from lines 190, 191, 192, and the reference current signals $i_{as}^*$, $i_{bs}^*$, $i_{cs}^*$ are obtained on lines 90, 91, 92, respectively. The errors are derived on lines 93, 94, 95 from subtractors S10, S11, S12, respectively, and applied to DB1, DB2, DB3, respectively.

Figure 12:
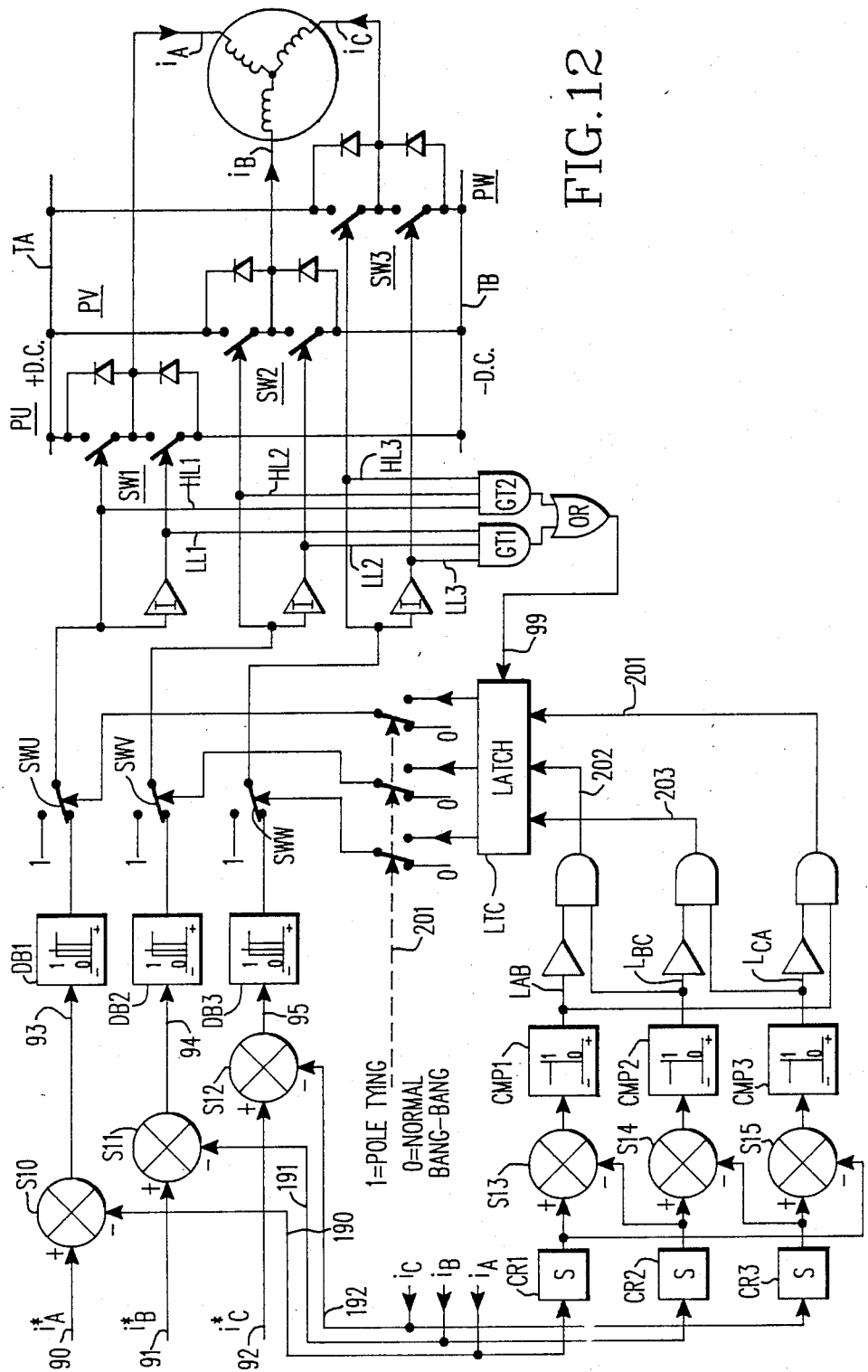
FIG. 12 is a pole-tying current control apparatus according to the invention which can be applied to the speed/flux control system of FIG. 4.

Referring to FIG. 12, the same technique is shown on the upper part of the Figure. It will be explained now how the conventional bang-bang approach is to be improved and why.

In vector control systems for high performance ac drive control algorithms are used which define the required values of the motor phase currents at all times. Controlling the motor currents to the reference values with specified accuracy and bandwidth is a significant problem in the implementation of such systems.

The constant voltage DC-line inverter is the preferred static power converter for AC servo drives. The inverter is capable of producing six different non-zero output voltage vectors and two null vectors (the latter when the output lines are shorted). There are a number of schemes for controlling the output current of this type of inverter. One of these which is simple and very effective is the bang-bang system shown in FIG. 11. This controller acts in a non-linear way to keep the motor phase current errors within an acceptable deadband around the target values. The rate at which the inverter poles switch is not constant, but depends on DC link voltage, back-emf of the motor, motor impedance and the size of the error deadband. From a control point of view, this system produces optimum response, but it suffers from a tendency to switch at excessively high frequency on all inverter poles when the motor back-emf is low. This effect may become so severe that in many cases it could cause failure of the inverter hardware.

There are methods of switching this type of inverter on an open-loop basis so as to generate desirable output voltage waveforms. The invention stems from the observation that very high switching frequencies are not "necessary" in order to produce acceptable currents in motors under low back-emf. To this effect, an overriding current control scheme is now proposed which does not suffer from the tendency to switch at high frequency, while still retaining the rapid response quality of the conventional bang-bang method.

The proposed scheme takes advantage of the fact that the motor has only two independent current variables to be controlled via two independent line-to-line voltages. At any time, therefore, two poles of the inverter can be used to actively control the motor current, while the third pole does not switch and simply establishes a reference potential on its associated motor terminal. The selection of such "third pole" is cyclic and occurs by permutation, it being determined by observing motor back-emf.

The proposed current control scheme will be described illustratively by reference to an induction motor load, although the same method could be used for any kind of three-phase load. From the coupled circuit model of the induction motor, the following relationship can be identified:

$$p.i_n = (V_n - e_n)/K \qquad (1)$$

where
 $n = a,b,c$, designates the motor phases
 $v =$ motor phase voltage
 $i =$ motor phase current
 $e_n =$ motor phase back-emf The $e_n$ term in this equation is a function of motor speed, flux linkages and stator current and the constant K is the apparent motor leakage inductance. Under the special condition that the inverter poles all assume the same state, the motor terminals are short-circuited and the rate of change of phase current becomes proportional to the associated motor phase back-emf. Under such special condition, the following equations hold:

$$Ke_{ab} = p \cdot (i_b - i_a) \qquad (2)$$
$$Ke_{bc} = p \cdot (i_c - i_b)$$
$$Ke_{ca} = p \cdot (i_a - i_c)$$

where $e_{ab}$, $e_{bc}$, $e_{ca}$ are the line-to-line motor back-emfs.

The back-emfs defined by Equation 2 could conceivably be evaluated for control purposes, but noise and accuracy problems make this approach unattractive. Instead, it is proposed to measure only the polarity of each emf. Using a simple logic with comparators CMP1, CMP2 and CMP2 of FIG. 12, logic signals LAB, LBC and LCA are derived which effect a comparison between consecutive phase lines, and provide a logical conclusion via an inverting circuit I and AND device. The latter cause lines 201, 202, 203 to assume a distinguishing logical state characterizing the back emf for one pole as opposed to the two others. Thus, the resulting three bits of information of LAB, LBC and LCA make it possible to determine which (201, 202 or 203) phase line of the motor exhibits the highest emf potential. When such phase line is recognized to be at the highest potential, the corresponding switch (SWU, SWV or SWW) is set to the ONE position. For such position, in the instance shown in the drawing by position 1, taken by the particular switch (say SWU) the reference line (96, 97, or 98) is overriden. The subsequent switch (SW1) is accordingly controlled so as to connect the phase line of the motor to the upper rail (positive terminal TA). Then, the following facts apply to each of the other two poles (PV, PW):

(a) Connection to the positive rail TB by the upper arm of the switch (SW2 or SW3) will increase the associated motor line current.

(b) Assuming that the DC rail voltage exceeds the motor line-to-line emfs, connection by the lower arm of the switch to the negative rail (TB) terminal voltage will decrease the associated motor line current.

(c) If the motor emf is low, then the rate of decrease of current will be high and the rate of increase will be low, and vice versa.

This situation is desirable for purposes of control because a change in the pole state is guaranteed to reverse the slope of its output current. A simple bang-bang strategy applied to the two switching-poles under control (SW2, SW3) is sufficient to achieve the required current control.

Figure 13:
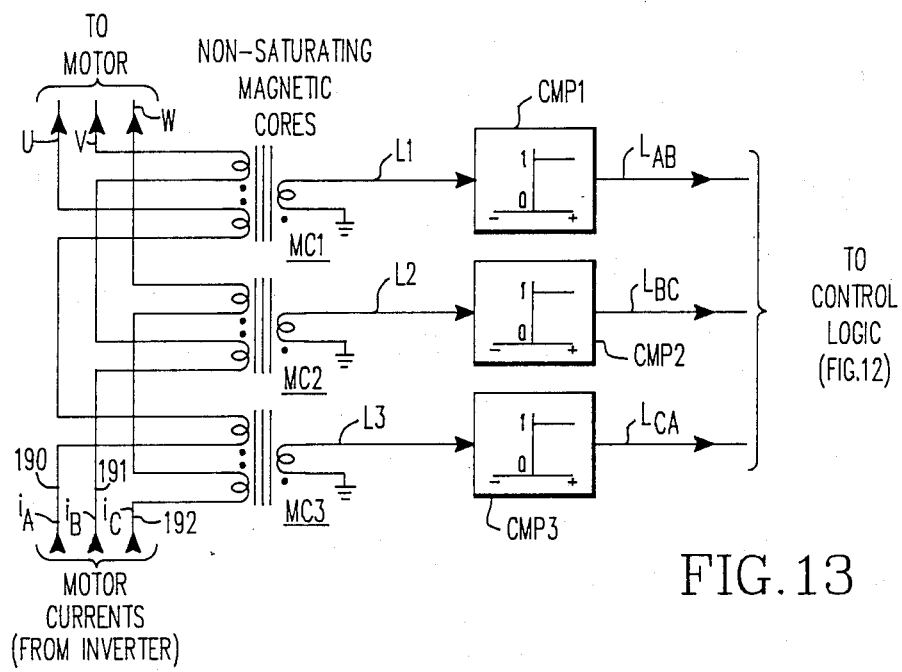
FIG. 13 is a block diagram illustrating the detection of motor emf as can be used in the current control system of FIG. 12.

The three-bit emf code ($L_{ab}$, $L_{bc}$, $L_{ca}$) used as shown in FIGS. 12 and 13, is applied to a latch LTC to update the reference selection of the tied pole by switch (SWU, SWV or SWW) at a moment when the inverter poles all have the same state (short-circuited). This situation occurs recurrently without any other special action being required than to identify it from the inverter switching logic of gates GT1, GT2 and the associated common OR device. Since it can be shown that the emf variables (detected from summers S13, S14, S15 and the associated comparators and current rate circuits CR1, CR2, CR3) change relatively slowly in the case of ac motors, this periodic sampling by latch LTC is adequate to ensure selection of which of the motor phase-lines is to be tied to the positive DC rail TA (in the illustration of FIG. 12) for creating a tied-pole within the cyclic recurrence. It is observed indeed, that by changing the logic of LA, LB, LC and lines 201, 202, 203 which set one of the switches SWU, SWV, SWW, and determine the operation of double-arm switches SW1, SW2, SW3, the motor-phase line could have been chosen to be tied to the negative rail TB, instead.

FIG. 13 illustrates a preferred method for performing the proposed emf detection. In this case magnetic elements MC1, MC2, MC3 are used to achieve the necessary differentiation, subtraction, and isolation.

From the preceding it appears that the operation of the current control system of FIG. 12 is as follows:

The three reference currents $i_a^*$, $i_b^*$, $i_c^*$ derived on lines 90, 91 92 from computer MCP are compared at S10, S11, S12 to the respective motor currents $i_a$, $i_b$, $i_c$ derived on lines 190, 191, 192, thereby obtaining the respective error signals on lines 93, 94 and 95. The error signal is passed through a corresponding deadband comparator (DB1, DB2 or DB3). As opposed to FIG. 11, in FIG. 12 on each output line 96, 97 or 98 the outputted signal (false, or true) is passed to the gating circuits of the thyristors (symbolized by double—arm switches SW1, SW2, SW3) of a corresponding inverter pole (PU, PV or PW), provided the switch (SWU, SWV, SWW) is in a lower position as shown, then, it goes via two lines: one for the upper rail (TA), the other (after inversion of the logic) for the lower rail (TB) of the DC link. Accordingly, for SWU, for instance, upon a "true" logic applied to the upper line 96, the upper part of switch SW1 (namely the corresponding thyristor of pole PU) will connect the motor phase line (U) to the positive rail TA, whereas upon a "false" on the upper line 96, there is a "true" on the lower part going to the lower part of switch SW1, so that pole PU will be connecting phase line U to the negative rail TB. The same is done for poles PV and PW in relation to SWV and SWW.

The states of the upper and lower lines for SW1, SW2 and SW3 are sensed by lines HL1, HL2, HL3 for the upper lines and read by gate GT2, while sensing is by lines LL1, L12, LL3 for the lower lines, the states being sensed and read by gate GT1 in this second instance. An OR device reads either GT1, or GT2, and on line 99 is detected when the three poles are altogether connected to the same rail. When such motor short-circuiting condition exists as detected, line 99 causes latch LTC to latch its inputs from lines 201, 202, 203.

The code logic of lines 201-203 is provided at the output of AND devices combining two consecutive ones of the LAB, LBC and LCA signals from comparators CMP1, CMP2 and CMP3, respectively. As shown earlier in FIG. 5 with respect to transformer TNF1, TNF2 and TNF3, the rate of change for $d(i_a-i_b)dt$, $d(i_b-i_c)dt$ and $d(i_c-i_a)dt$ is derived from, respectively, subtracters S13, S14 and S15, each responsive to the difference between the outputs of two consecutive current rate circuits CR1, CR2, CR3, where $i_a$, $i_b$ and $i_c$ are themselves derived from current lines 190, 191 and 192. As a result, a single logic combination of lines 201, 202, 203 will provide a command signal forcing the arm of a corresponding one of the three switches SWU, SWV and SWW into its upper position (shown as a logic one). Therefore, for such position #1, the signal of line 96, 97 or 98 is overriden and a "true" signal will be imposed on the corresponding line, thereby causing the upper arm of SW1, SW2 or SW3 to connect the phase line for that pole to the upper rail or positive terminal (TA). Therefore, that particular pole is "tied" to one rail of the DC-link. In the meantime, the two other poles are normally responding to the two other lines (96, 97, 98) from the (DB1, DB2); or (DB2, DB3); or (DB3, DB1) logic, depending upon which pair of poles has been left to operate under normal bang-bang control.

It is also noted that by line 210 the computer MCP will decide whether the pole-tying mode is to be used, or not. This is done, by switching a switch SW ON so as to allow to pass the values of LTC latched by line 99 onto the controlling lines of switches SWU, SWV and SWW whereby two of the switches will allow operation, with two of lines 96, 97, 98, of two of the switches SW1, SW2, SW3 under bang-bang control, while the third switch is being "tied".

FIG. 13 shows the detection of the motor emf in its preferred form. Non-saturating magnetic cores MC1, MC2, MC3 (instead of the transformers TNF1, TNF2, TNF3 of FIG. 5) are used to derive the rate of change $d(i_a-i_b)dt$, $d(i_b-i_c)dt$ and $d(i_c-i_a)dt$ on respective lines L1, L2, L3 which are the input lines of comparators CMP1, CMP2, CMP3 detecting among the three vectors which one is negative. This is translated, as earlier explained, by the logic combination LAB, LBC, LCA at the three outputs.

Figure 14:
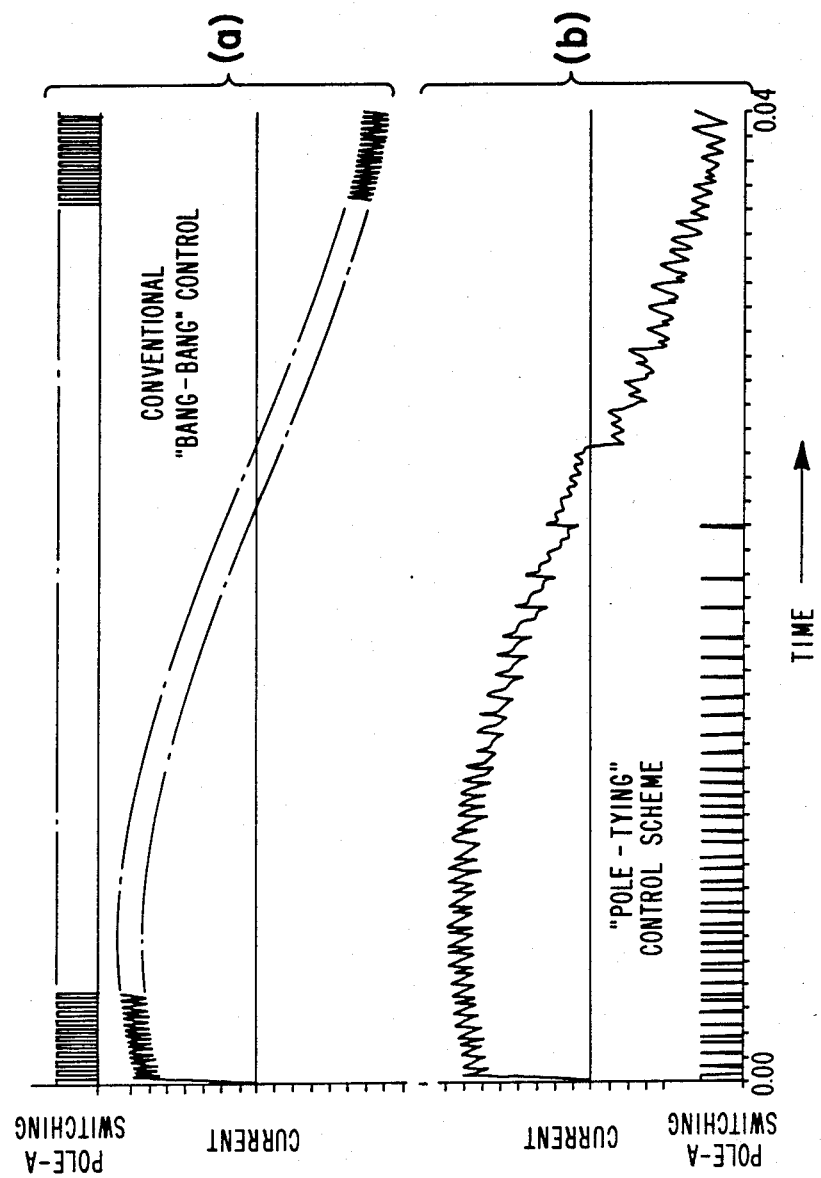
FIG. 14 shows waveforms providing a comparison between the prior art bang-bang control technique of FIG. 11 and the pole-tying scheme used in a bang-bang control system as shown in FIG. 12.

FIG. 14 is showing with curve (c) the lower frequency of bang-bang control achieved under the pole-tying control scheme according to the invention, as opposed to the high frequency of switching exhibited by curve (b) when the conventional bang-bang technique is used. Curve (a) indicates the pole switching frequency.

Figure 15A:
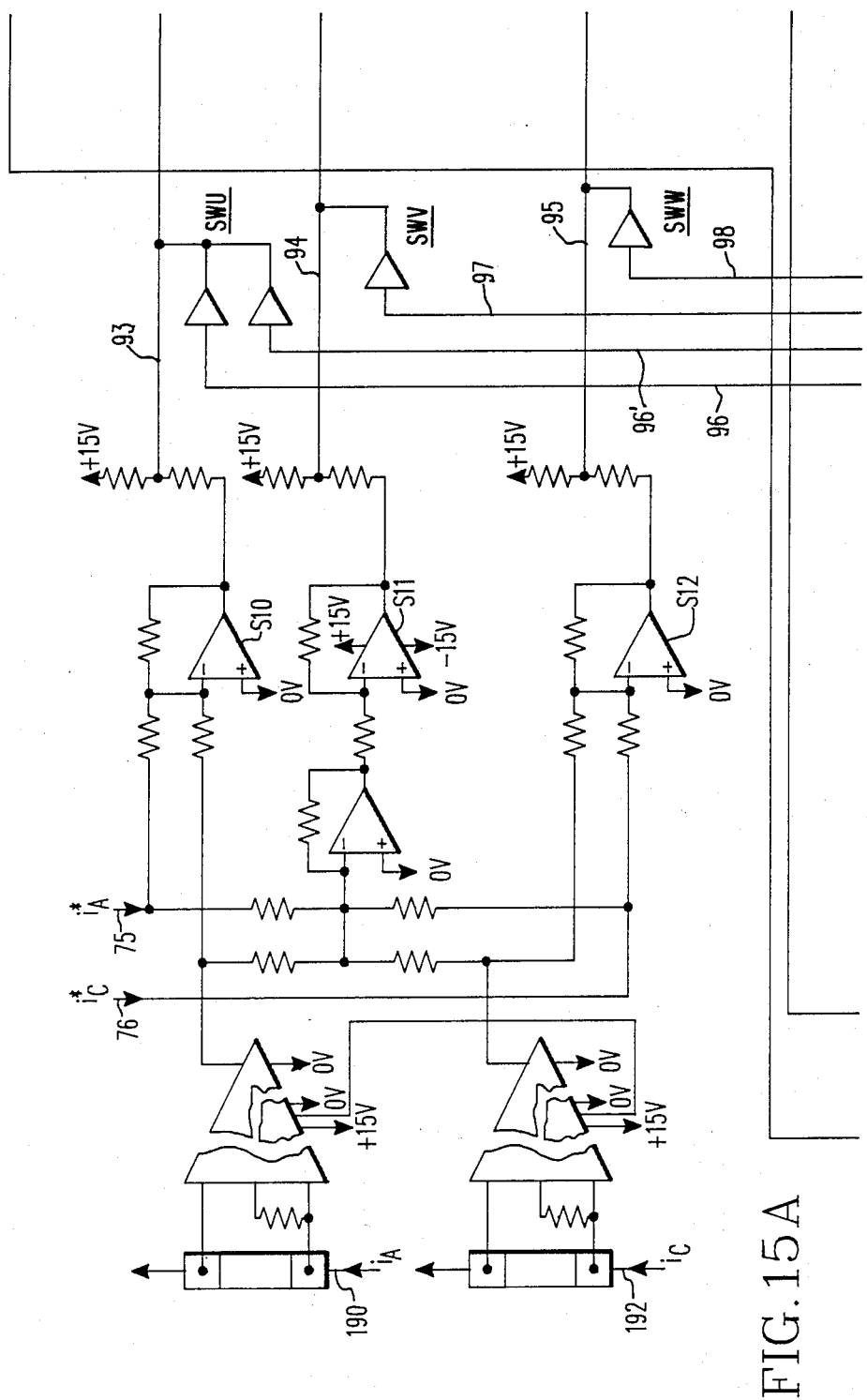
FIG. 15 is a hardware implementation of the current regulator of FIG. 12.
Figure 15B:
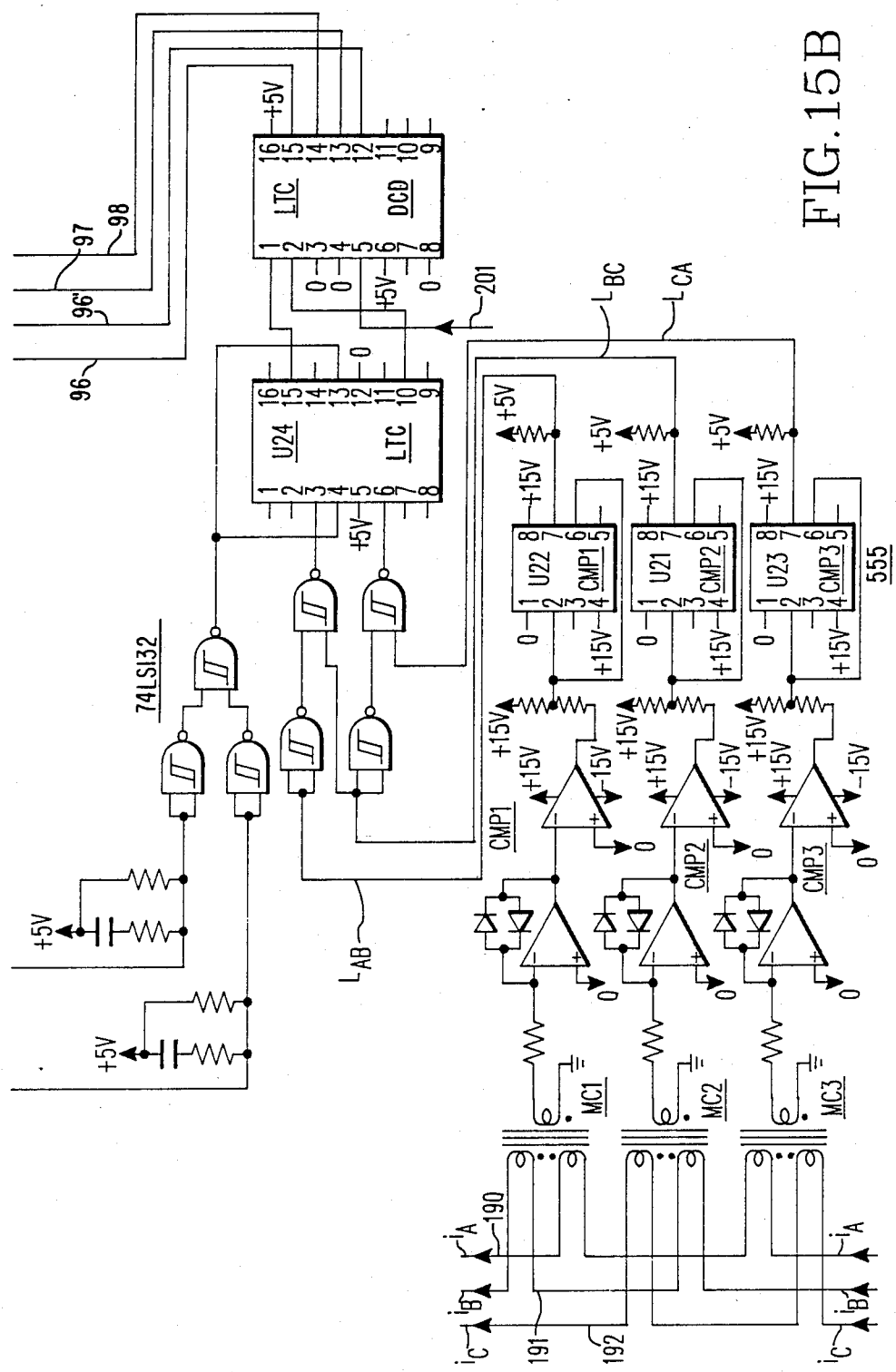
Figure 15C:
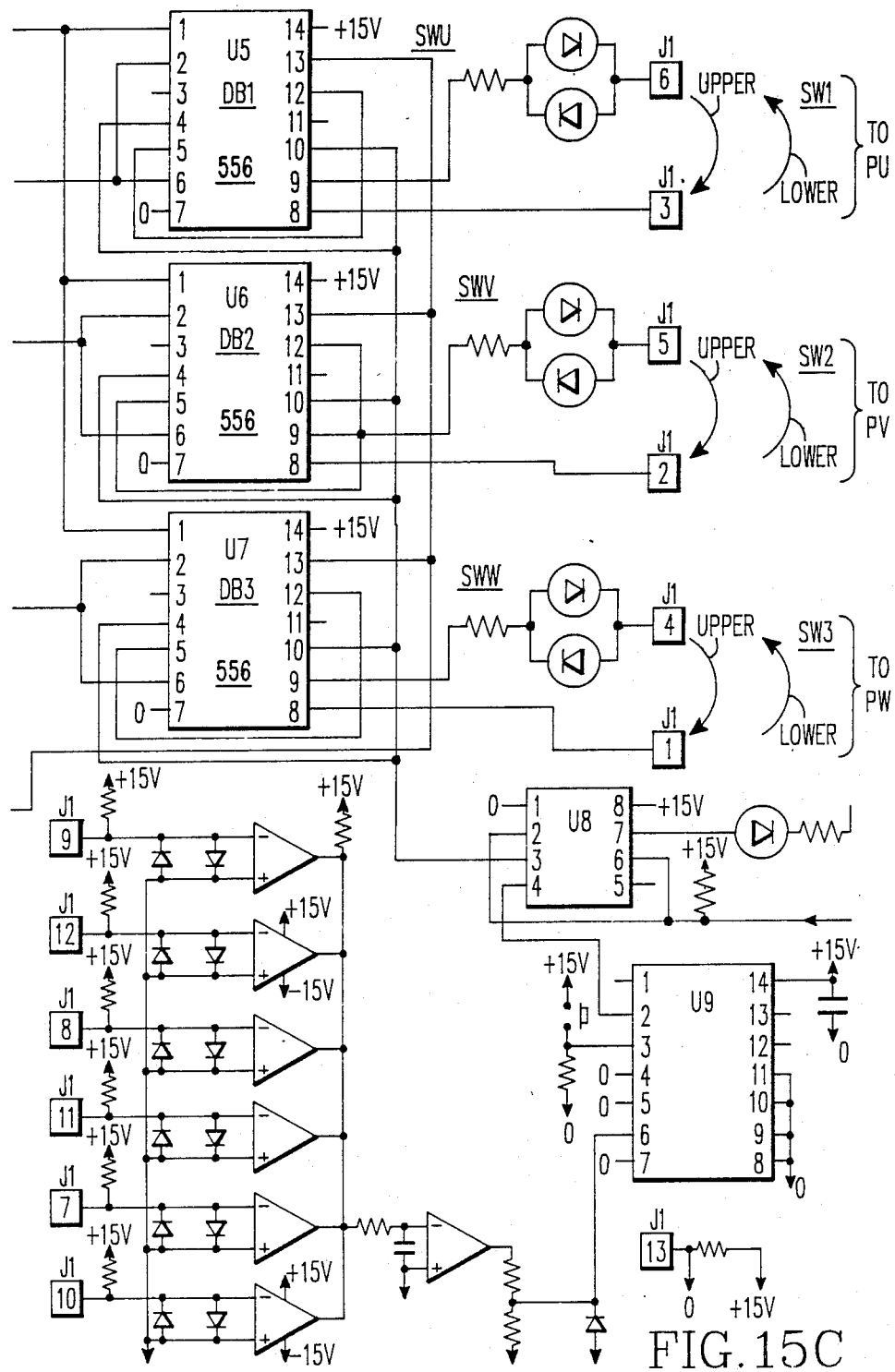

Referring to FIG. 15, a hardware implementation of the circuit of FIG. 12 is illustratively given. Using the same notation as in FIG. 12, the components shown are so identified as to match the blocks and lines of FIG. 12 for the same functions and signals.

To summarize, first a torque/flux control system for an induction motor drive has been described in which when the speed goes out of range or returns to the normal range of operation, the resultant vector current in the motor is limited by establishing the priority of flux-demand over torque-demand. As shown by a curve characterizing the function of FG1 in FIG. 4, as long as the speed remains in the normal range, the flux demand is held constant. The invention comes into effect for the zones outside the range (for positive and negative speed respectively). As illustrated, the flux is forced down from the normal constant level, or brought back to it. In so doing $i_d^*$ is allowed (line 15) to carry such flux-forcing effect until the limit LIM imposed by limiter (LMT1). Thus, the flux is forced down when the speed (for one polarity) goes up, and is forced-up when the speed decreases, as seen relative to the flat portion under normal or base speed operation within FG1 of FIG. 4. Such "flux-forcing" action influences the flux. Therefore, in the machine (by line 23) the actual torque is converted into speed (TF2) and an additional compensating torque is supplied by line 16 ($i_q^*$). If the speed is too low, there will be a positive torque demand, if the speed is too high there will be a negative torque demand. However, a limit ALIM is imposed on that torque as explained earlier by reference to lines 5, 6, controller CTL and transfer function TF3.

In other words, the actual speed (line 23) dictates the value of the flux, subject to flux constraints as specified within FG1.

Secondly, a pole-tying current control apparatus has also been described, illustrated with the speed/flux control system and implemented for a bang-bang controlled system. Instead of using conventionally the bang-bang method, the invention calls for a control scheme by which each pole of the inverter is in turn tied to the rails, while the two other poles respond to normal bang-bang control.

In the proposed current control scheme, each pole of the inverter is in turn typically idle under the tied-up upper rail for 120 degrees of the fundamental output cycle and it thereafter switches normally for 240 degrees. When the motor back-emf is low, a pole will typically switch to the high state momentarily, causing the current to rapidly cross the error deadband, then it will remain in the low state for a substantial duration while the error slowly returns, governed mainly by the natural decay time constant of the load. The induction motor exhibits this effect particularly strongly since the natural roots of the motor have long time constants at very low speeds, i.e., when the emf is low. The average switching frequency is, thus, dramatically reduced in comparison with a conventional bang-bang controller.

Since the current control scheme only holds two of the motor currents within their target deadbands at any time, it follows that the third motor current can develop an error which may be twice the size of the set deadband, but this can be taken into account by choosing the size of the deadband.

When the motor emf is low, the motor short circuit condition used to sample the back emf occurs frequently and there are more than enough samples of emf polarity for the system to function correctly. This situation changes as the motor speed increases and the back-emf rises to a point where it nearly equals the DC-link voltage in magnitude. In order to avoid large uncontrolled currents, the inverter may be forced to assume the short-circuit state periodically, thereby avoiding this situation. Another approach is to allow the scheme to revert to conventional bang-bang control whenever the back emf has risen sufficiently (i.e. above some specified motor speed), since the conventional bang-bang allows safe operation all the way to the voltage limits with no excessive switching frequency in this region. Control by line 201 allows such mode adjustment.

For simplicity, the scheme has been described using only the positive rail TA of the DC link as the rail to tie the third pole to. This approach could, in some cases, lead to practical difficulties. For example, at very low output frequencies the lower switch in the reference pole might carry uninterrupted load current for long periods of time. If the semiconductor switch has high conduction losses, this could be thermally undesirable and it would lead to a lower rating for the equipment. This problem is eliminated by alternately using the positive and negative rails as the reference potentials. In the same way that the most negative emf potential is deduced from the three bits of emf information of logic lines LAB, LBC and LCA, the most positive terminal can also be selected and the pole so identified will be tied to the positive rail TA of the inverter. Simple circuitry can be arranged to make the system oscillate between the selection of the positive and the selection of the negative rail as a reference potential.

Accordingly, the pole-tying current control apparatus according to the invention in its second aspect is based on:

(a) The ideal of using two of the inverter poles to control current while the third pole establishes a reference potential on the motor;

(b) A method of observing motor back-emf in order to deduce which pole should establish the reference; and (c) The incorporation of the two previous points (a) and (b) into a bang-bang current controller with consequential benefits.

The following page is Appendix page A1.

APPENDIX A
COMPUTER PROGRAM LISTINGS

MCS-51 MACRO ASSEMBLER      SPIN

ISIS-II MCS-51 MACRO ASSEMBLER V2.1
OBJECT MODULE PLACED IN :F1:SPIN.OBJ
ASSEMBLER INVOKED BY:  ASM51 :F1:SPIN.ASM

```
LOC  OBJ           LINE      SOURCE
                    1        ;VERSION T(11/6/84) INCLUDE TEST PORT 6
                    2        ;VERSION S(9/26/84)
                    3        ;SPEED REGULATOR CONTROL PROGRAM FOR A
                    4        ;HIGH SPEED HIGH PERFORMANCE INDUCTION
                    5        ;MOTOR DRIVE.
                    6        ;***************************************
                    7        ;DEFINE PROGRAM CONSTANTS
003C                8        X1 EQU 03CH ; POINTER TO TOP OF COUNTER
                    9                    ; STORAGE BLOCK FOR SPEED
                   10                    ; MEASUREMENT. (+1)
00B4               11        X2 EQU 180  ; CONSTANT FOR TESTING SPEED
                   12                    ; THRESHOLD
002A               13        X3 EQU 42   ; (T2/TA) RATIO
0008               14        X4 EQU 8    ; (DT/TA)*(2**8)
```

```
LOC  OBJ              LINE  SOURCE
 0080                  15   X5 EQU 128   ; SCALING FRACTION (1/Q)*(2**8)
                       16   ;************************************
                       17   ;INITIALIZATION ROUTINES ARE LOCATED AT
                       18   ;795H AND ABOVE
 0795                  19       ORG 795H
                       20   ;START INITIALIZATION PROCEDURE
                       21   ;
 0795 75895D           22   LB1: MOV TMOD,#05DH  ;TIMER 0= 16 BIT CNTR
                       23                        ;          GATE=1
                       24                        ;TIMER 1= 16 BIT CNTR
                       25                        ;          GATE=0
 0798 758850           26       MOV TCON,#050H   ;TR1=TR0=1
 079B D2D3             27       SETB PSW.3       ;SELECT RB1.
 079D 7930             28       MOV R1,#030H     ;INITIALIZE COUNT
                       29                        ;STORAGE POINTER.
 079F 751906           30       MOV 19H,#6       ;TEST PORT POINTER
                       31                        ;IN R1 BANK 3.
 07A2 020003           32       LJMP LB11        ;START MAIN PROG.LOOP
                       33   ;************************************
 0000                  34       ORG 0
 0000 020795           35       LJMP LB1    ;ENTRY POINT JUMP
                       36   ;************************************
                       37   ;************************************
                       38   ;PROCEDURE FOR SPEED MEASUREMENT BY PULSE
                       39   ;COUNTING.TL1 COUNTS ENCODER PULSES.
                       40   ;R1(BANK 1) POINTS TO 1 OF 12 STORAGE
                       41   ;LOCATIONS, ONE FOR EACH OF THE LAST
                       42   ;12 COUNT VALUES. ROUTINE TAKES THE
                       43   ;DIFFERENCE BETWEEN THE PRESENT COUNT AND
                       44   ;THE 11TH PRECEDING COUNT.
 0003 75D008           45   LB11: MOV PSW,#08   ;SELECT REGISTER BANK 1
                       46   ;************************************
                       47   ;FIRST ESTABLISH THE SPEED POLARITY AND
                       48   ;SET P3.0 ACCORDINGLY.NOTE: LOCS. 26H AND
                       49   ;27H CONTAIN THE LAST TWO SAMPLES OF TL0
                       50   ;************************************
 0006 C3               51       CLR C
 0007 E526             52       MOV A,26H
 0009 9527             53       SUBB A,27H
 000B C3               54       CLR C
 000C 9401             55       SUBB A,#1
 000E 92B0             56       MOV P3.0,C       ;P3.0 IS NOW SET TO SPEED
                       57                        ;POLARITY
                       58                        ;(HIGH IF 26H=27H, ELSE LOW)
                       59   ;************************************
 0010 E58B             60       MOV A,TL1        ;GET PRESENT COUNT
 0012 F7               61       MOV @R1,A        ;ENTER INTO STORAGE BLOCK
 0013 09               62       INC R1           ;INCREMENT POINTER
 0014 B93C0A           63       CJNE R1,#X1,LB20 ;JUMP IF NO PNTR OVFLOW
 0017 7930             64       MOV R1,#30H      ;RESET POINTER TO 30H
 0019 852627           65       MOV 27H,26H      ;UPDATE THE SAMPLES OF TL0
                       66                        ;FOR POLARITY CALC
 001C 858A26           67       MOV 26H,TL0      ;26H CONTAINS NEW SAMPLE,
                       68                        ;27H CONTAINS PREVIOUS ONE.
 001F 8007             69       SJMP LB21
 0021 00               70   LB20: NOP
 0022 00               71       NOP
 0023 00               72       NOP
 0024 00               73       NOP
 0025 00               74       NOP
 0026 8000             75       SJMP LB21
 0028 C3               76   LB21: CLR C
 0029 97               77       SUBB A,@R1       ;SUBTRACT 11TH PREVIOUS FROM
                       78                        ;PRESENT COUNT.
                       79                        ;A=SPEED(0-255 WITH POSS.OVFLOW)
                       80   ;************************************
                       81   ;OUTPUT SPEED TO PORT 3
 002A 7803             82       MOV R0,#3
 002C F2               83       MOVX @R0,A
                       84   ;************************************
                       85   ;
                       86   ;PROCEED TO LOOKUP FLUX REFERENCE
 002D 75D000           87   LB2: MOV PSW,#00H ;SELECT REGISTER BANK 0
 0030 758302           88       MOV DPH,#02
 0033 F582             89       MOV DPL,A
                       90   ;************************************
```

| LOC | OBJ | LINE | SOURCE | |
|---|---|---|---|---|
| | | 91 | ;SET P3.1 IF SPEED GREATER THAN 75 DECIMAL | |
| 0035 | 24B4 | 92 | ADD A,#X2 | |
| 0037 | 92B1 | 93 | MOV P3.1,C | |
| | | 94 | ;***************************************** | |
| 0039 | E4 | 95 | CLR A | ;POINT TO ENTRY IN THE FLUX |
| | | 96 | | ;REF TABLE (200-2FF) |
| 003A | 93 | 97 | MOVC A,@A+DPTR ;A=FLREF(0-FF) ( = A(N) ) | |
| | | 98 | ;***************************************** | |
| | | 99 | ; | |
| | | 100 | ; | |
| | | 101 | ;***************************************** | |
| | | 102 | ;START THE PROCEDURE FOR CALCULATING THE D-AXIS | |
| | | 103 | ;CURRENT REFERENCE FROM THE VALUE OF FLREF | |
| | | 104 | ;  ( = A(N) ) HELD IN THE ACCUMULATOR | |
| | | 105 | ;NOTE: A(N) = 0-FF | |
| | | 106 | ;       R6,R7 = C(N+1) | |
| | | 107 | ;       R4,R5 = B(N) | |
| | | 108 | ;***************************************** | |
| 003B | 75F008 | 109 | MOV B,#X4 | ;LOAD B WITH VALUE CORRESPONDING |
| | | 110 | | ;TO (DT/TA)*(2**8) |
| 003E | C3 | 111 | CLR C | |
| 003F | 9C | 112 | SUBB A,R4 | ;ACC=INT(A(N) - B(N)) |
| 0040 | 500C | 113 | JNC LB13 | ;JUMP IF POS PROCEED FOR NEGATIVE |
| 0042 | F4 | 114 | CPL A | |
| 0043 | 04 | 115 | INC A | |
| 0044 | A4 | 116 | MUL AB | |
| 0045 | CD | 117 | XCH A,R5 | |
| 0046 | 9D | 118 | SUBB A,R5 | |
| 0047 | FD | 119 | MOV R5,A | |
| 0048 | EC | 120 | MOV A,R4 | |
| 0049 | 95F0 | 121 | SUBB A,B | |
| 004B | FC | 122 | MOV R4,A | |
| 004C | 800C | 123 | SJMP LB14 | ;R4,R5= B(N+1) |
| | | 124 | ; | = ((DT/TA)*(A(N)-B(N)))+B(N) |
| 004E | 00 | 125 | LB13: NOP | |
| 004F | 00 | 126 | NOP | |
| 0050 | A4 | 127 | MUL AB | |
| 0051 | CD | 128 | XCH A,R5 | |
| 0052 | 2D | 129 | ADD A,R5 | |
| 0053 | FD | 130 | MOV R5,A | |
| 0054 | EC | 131 | MOV A,R4 | |
| 0055 | 35F0 | 132 | ADDC A,B | |
| 0057 | FC | 133 | MOV R4,A | |
| 0058 | 8000 | 134 | SJMP LB14 | ;R4,R5 = B(N+1) |
| | | 135 | ; | = ((DT/TA)*(A(N)-B(N)))+B(N) |
| | | 136 | ; | |
| | | 137 | ;NOTE:R4,R5=B(N+1) WGHT FACTOR (2**-8) POSITIVE | |
| | | 138 | ;     R6,R7=C(N+1)               DITTO   DITTO | |
| | | 139 | | |
| 005A | C3 | 140 | LB14: CLR C | |
| 005B | ED | 141 | MOV A,R5 | |
| 005C | 9F | 142 | SUBB A,R7 | |
| 005D | F9 | 143 | MOV R1,A | |
| 005E | EC | 144 | MOV A,R4 | |
| 005F | 9E | 145 | SUBB A,R6 | |
| 0060 | F8 | 146 | MOV R0,A | ;R0,R1=D(N+1), WT=(2**-8) , POS/NEG |
| 0061 | 9207 | 147 | MOV 20H.7,C | ;SAVE SIGN OF THIS RESULT IN 20H.7 |
| 0063 | 9206 | 148 | MOV 20H.6,C | ;DUPLICATE THE SIGN IN 20H.6 |
| 0065 | 75F02A | 149 | MOV B,#X3 | ;LOAD B WITH T2/TA VALUE |
| 0068 | 5035 | 150 | JNC LB5 | ;JUMP FOR POS PROCEED FOR NEGATIVE |
| 006A | E9 | 151 | MOV A,R1 | |
| 006B | F4 | 152 | CPL A | |
| 006C | 2401 | 153 | ADD A,#1 | |
| 006E | F9 | 154 | MOV R1,A | |
| 006F | E8 | 155 | MOV A,R0 | |
| 0070 | F4 | 156 | CPL A | |
| 0071 | 3400 | 157 | ADDC A,#0 | |
| 0073 | F8 | 158 | MOV R0,A | ;R0,R1=MOD(D(N+1)), WT=(2**-8) |
| | | 159 | | ;SIGN IN 20H.6 |
| 0074 | E9 | 160 | MOV A,R1 | |
| 0075 | A4 | 161 | MUL AB | |
| 0076 | ABF0 | 162 | MOV R3,B | ;SAVE MSBYTE IN R3 DISCARD LSBYTE |
| 0078 | E8 | 163 | MOV A,R0 | |
| 0079 | 75F02A | 164 | MOV B,#X3 | |
| 007C | A4 | 165 | MUL AB | |

| LOC | OBJ | LINE | SOURCE | |
|---|---|---|---|---|
| 007D | 2B | 166 | ADD A,R3 | |
| 007E | C5F0 | 167 | XCH A,B | |
| 0080 | 3400 | 168 | ADDC A,#0 | |
| 0082 | C5F0 | 169 | XCH A,B | ;B,A = (T2/TA)*MOD(D(N+1)),WT = 1 |
| | | 170 | | ;SIGN IN 20H.7 |
| 0084 | C3 | 171 | CLR C | |
| 0085 | 9E | 172 | SUBB A,R6 | |
| 0086 | FB | 173 | MOV R3,A | |
| 0087 | E5F0 | 174 | MOV A,B | |
| 0089 | 9400 | 175 | SUBB A,#0 | |
| 008B | 4008 | 176 | JC LB12 | ;JMP IF OPER. PRODUCES SIGN CHANGE |
| 008D | 00 | 177 | NOP | |
| 008E | 00 | 178 | NOP | |
| 008F | 00 | 179 | NOP | |
| 0090 | 00 | 180 | NOP | |
| 0091 | 00 | 181 | NOP | |
| 0092 | FA | 182 | MOV R2,A | ;R2,R3 = (T2/TA)*MOD(D(N+1))-C(N+1) |
| | | 183 | | ;WT = 1 , SGN IN 20H.7 |
| 0093 | 8033 | 184 | SJMP LB6 | |
| 0095 | EB | 185 | LB12: MOV A,R3 ;RETRIEVE THE LSBYTE | |
| 0096 | F4 | 186 | CPL A | |
| 0097 | 04 | 187 | INC A | ;CHANGE THE SIGN |
| 0098 | FB | 188 | MOV R3,A | ;REPLACE THE NEW VALUE |
| 0099 | C207 | 189 | CLR 20H.7 | ;SET THE SIGN FLAG TO POSITIVE |
| 009B | 7A00 | 190 | MOV R2,#0 | ;SET MSBYTE TO ZERO |
| 009D | 8029 | 191 | SJMP LB6 | |
| 009F | 00 | 192 | LB5: NOP | |
| 00A0 | 00 | 193 | NOP | |
| 00A1 | 00 | 194 | NOP | |
| 00A2 | 00 | 195 | NOP | |
| 00A3 | 00 | 196 | NOP | |
| 00A4 | 00 | 197 | NOP | |
| 00A5 | 00 | 198 | NOP | |
| 00A6 | 00 | 199 | NOP | |
| 00A7 | 00 | 200 | NOP | |
| 00A8 | 00 | 201 | NOP | |
| 00A9 | 00 | 202 | NOP | |
| 00AA | 00 | 203 | NOP | |
| 00AB | 00 | 204 | NOP | |
| 00AC | 00 | 205 | NOP | |
| 00AD | 00 | 206 | NOP | |
| 00AE | 00 | 207 | NOP | |
| 00AF | E9 | 208 | MOV A,R1 | |
| 00B0 | A4 | 209 | MUL AB | |
| 00B1 | ABF0 | 210 | MOV R3,B | ;SAVE MSBYTE IN R3 DISCARD LSBYTE |
| 00B3 | E8 | 211 | MOV A,R0 | |
| 00B4 | 75F02A | 212 | MOV B,#X3 | |
| 00B7 | A4 | 213 | MUL AB | |
| 00B8 | 2B | 214 | ADD A,R3 | |
| 00B9 | C5F0 | 215 | XCH A,B | |
| 00BB | 3400 | 216 | ADDC A,#0 | |
| 00BD | C5F0 | 217 | XCH A,B | |
| 00BF | 2E | 218 | ADD A,R6 | |
| 00C0 | FB | 219 | MOV R3,A | |
| 00C1 | E5F0 | 220 | MOV A,B | |
| 00C3 | 3400 | 221 | ADDC A,#0 | |
| 00C5 | FA | 222 | MOV R2,A | ;R2,R3 = (T2/TA)*MOD(D(N+1))+C(N+1) |
| | | 223 | | ;WT=1 ,SGN IN 20H.7 |
| 00C6 | 8000 | 224 | SJMP LB6 | |
| 00C8 | E9 | 225 | LB6: MOV A,R1 ;NOTE: R0,R1 STILL HOLD MOD(D(N+1)) | |
| | | 226 | | ;WT=2**-8 , SGN IN 20H.6 |
| 00C9 | 75F008 | 227 | MOV B,#X4 | ;LOAD B WITH (DT/TA)*(2**8) |
| 00CC | A4 | 228 | MUL AB | |
| 00CD | A9F0 | 229 | MOV R1,B | ;SAVE MSBYTE DISCARD LSBYTE |
| 00CF | E8 | 230 | MOV A,R0 | |
| 00D0 | 75F008 | 231 | MOV B,#X4 | ;LOAD B WITH (DT/TA)*(2**8) AGAIN |
| 00D3 | A4 | 232 | MUL AB | |
| 00D4 | 29 | 233 | ADD A,R1 | |
| 00D5 | F9 | 234 | MOV R1,A | |
| 00D6 | E5F0 | 235 | MOV A,B | |
| 00D8 | 3400 | 236 | ADDC A,#0 | |
| 00DA | F8 | 237 | MOV R0,A | ;R0,R1 = (DT/TA)*MOD(D(N+1)), WT=2 |
| | | 238 | | ;SGN IN 20H.6 |
| 00DB | 8E25 | 239 | MOV 25H,R6 | ;SAVE INT(C(N+1) FOR LATER USE |

| | | |
|---|---|---|
| 00DD 300609 | 240 | JNB 20H.6,LB60 ;JUMP IF SIGN POS,PROCEED FOR NE: |
| 00E0 C3 | 241 | CLR C |
| 00E1 EF | 242 | MOV A,R7 |
| 00E2 99 | 243 | SUBB A,R1 |
| 00E3 FF | 244 | MOV R7,A |
| 00E4 EE | 245 | MOV A,R6 |
| 00E5 98 | 246 | SUBB A,R0 |
| 00E6 FE | 247 | MOV R6,A |
| 00E7 8009 | 248 | SJMP LB61 |
| 00E9 00 | 249 | LB60: NOP |
| 00EA EF | 250 | MOV A,R7 |
| 00EB 29 | 251 | ADD A,R1 |
| 00EC FF | 252 | MOV R7,A |
| 00ED EE | 253 | MOV A,R6 |
| 00EE 38 | 254 | ADDC A,R0 |
| 00EF FE | 255 | MOV R6,A |
| 00F0 8000 | 256 | SJMP LB61 ;R6,R7 NOW UPDATED WITH C(N+2) |
| | 257 | ; |
| | 258 | ; |
| | 259 | ; |
| | 260 | ;R2,R3 CONTAINS THE TWO BYTE MODULUS(WT=1) OF |
| | 261 | ;THE D-AXIS CURRENT DEMAND. THE SIGN IS HELD IN |
| | 262 | ;20H.7. BEGIN THE PROCEDURE FOR SCALING THIS |
| | 263 | ;NUMBER BY 1/2 (0.10000000) AND LIMITING THE |
| | 264 | ;RESULT TO 255 |
| 00F2 EB | 265 | LB61: MOV A,R3 |
| 00F3 75F080 | 266 | MOV B,#X5 ;LOAD B WITH SCALING FRACTION |
| 00F6 A4 | 267 | MUL AB |
| 00F7 A9F0 | 268 | MOV R1,B ;DISCARD LSBYTE SAVE MSBYTE IN R1 |
| 00F9 EA | 269 | MOV A,R2 |
| 00FA 75F080 | 270 | MOV B,#X5 ;B=SCALING FRACTION AGAIN |
| 00FD A4 | 271 | MUL AB |
| 00FE 29 | 272 | ADD A,R1 ;A=NEW LSBYTE + PREVIOUS MSBYTE |
| 00FF F9 | 273 | MOV R1,A ;SAVE RESULT |
| 0100 E5F0 | 274 | MOV A,B |
| 0102 3400 | 275 | ADDC A,#0 |
| 0104 6004 | 276 | JZ LB7 ;JUMP IF SCALED RESULT < 256 |
| 0106 79FF | 277 | MOV R1,#0FFH ;SET RESULT TO LIMIT VALUE |
| 0108 8003 | 278 | SJMP LB8 |
| 010A 00 | 279 | LB7: NOP |
| 010B 8000 | 280 | SJMP LB8 ;R1=MODULUS OF RESULT |
| | 281 | ;LIMITED TO 0FFH |
| | 282 | ;************************************************ |
| | 283 | ;PROCEDURE TO LOOKUP THE LIMIT VALUE FOR THE |
| | 284 | ;MODULUS OF IQ, IQLIM=SQRT((LIM2)-(ID2)) |
| | 285 | ;FROM LOOKUP TABLE (300-3FF). ENTER WITH |
| | 286 | ;ID (0-FFH) IN R1 |
| 010D 8982 | 287 | LB8: MOV DPL,R1 |
| 010F 758303 | 288 | MOV DPH,#03 ;POINT TO ENTRY IN TABLE |
| 0112 E4 | 289 | CLR A |
| 0113 93 | 290 | MOVC A,@A+DPTR ;FETCH LIMIT VALUE |
| 0114 F5F0 | 291 | MOV B,A ;SAVE IT TEMPORARILY IN B FOR USE |
| | 292 | ;IN LIMITING THE IQ VAL |
| | 293 | ;************************************************ |
| | 294 | ;OUTPUT THE LIMIT VALUE TO PORT 5 |
| 0116 7805 | 295 | MOV R0,#5 |
| 0118 F2 | 296 | MOVX @R0,A |
| | 297 | ;************************************************ |
| | 298 | ; |
| | 299 | ;START THE PROCEDURE FOR CALCULATING THE SLIP |
| | 300 | ;ANGLE BY INTEGRATION OF THE SLIP FREQUENCY |
| | 301 | ;WHICH IS OBTAINED FROM INPUT OF SPEED REGULATOR |
| | 302 | ;ERROR (TORQUE PER UNIT FLUX, IQ) AND FROM |
| | 303 | ;PSI ( = C(N+1)) STORED IN LOC 25H. |
| | 304 | ;THE FORMULA BEING APPLIED IS AS FOLLOWS: |
| | 305 | ; THETA=THETA+(IQ*F(PSI)) |
| | 306 | ; WHERE IQ AND PSI ARE IN RANGE +/- 255 |
| | 307 | ; AND F(PSI) IS CONTAINED IN A 2-BYTE |
| | 308 | ; LOOKUP WITH 2**(-24) WEIGHT. |
| | 309 | ; THE RESULT OF THE MULT IS A 3-BYTE |
| | 310 | ; PRODUCT WITH WEIGHT 2**(-24). |
| | 311 | ; THE LSBYTE IS DISCARDED AND THETA IS |
| | 312 | ; INCREMENTED |
| 0119 75D010 | 313 | MOV PSW,#010H ;SELECT REGISTER BANK 2 |
| 011C 7802 | 314 | MOV R0,#2 |
| 011E E2 | 315 | MOVX A,@R0 ;INPUT IQ FROM A/D IN OFFSET BIN. |

```
011F C3          316           CLR C
0120 9480        317           SUBB A,#128 ;REMOVE THE OFFSET
0122 920F        318           MOV 21H.7,C ;SAVE THE SIGN IN 21H.7
0124 5003        319           JNC LB30    ;JUMP IF POS.PROCEED FOR NEG.
0126 F4          320           CPL A
0127 8003        321           SJMP LB31
0129 00          322     LB30: NOP
012A 8000        323           SJMP LB31
                 324                       ; A=MOD IQ (0-80H)
012C 23          325     LB31: RL A        ; A=(0-FFH)
012D F9          326           MOV R1,A    ;DUPLICATE IQ IN R1 FOR LATER
012E C3          327           CLR C
                 328     ;NOTE:B CONTAINS THE LIMIT VALUE
012F 95F0        329           SUBB A,B
0131 4004        330           JC LB50     ;JUMP IF THE VALUE OF MOD IQ
                 331                       ;IS SMALLER THAN LIMIT
0133 E5F0        332           MOV A,B     ;A=LIMIT VALUE
0135 8003        333           SJMP LB51
0137 E9          334     LB50: MOV A,R1    ;RETRIEVE THE ORIGINAL VALUE
0138 8000        335           SJMP LB51
013A F9          336     LB51: MOV R1,A    ;SAVE IN R1
013B F5F0        337           MOV B,A     ; B=MOD IQ
013D E4          338           CLR A
013E 852582      339           MOV DPL,25H
0141 758304      340           MOV DPH,#4  ;POINT TO LSBYTE OF F(PSI) TABLE
0144 93          341           MOVC A,@A+DPTR ;FETCH IT
0145 A4          342           MUL AB
0146 ABF0        343           MOV R3,B    ;DISCARD LSBYTE OF RESULT
                 344                       ;SAVE MSBYTE IN R3
0148 89F0        345           MOV B,R1    ;RELOAD B WITH MOD IQ
014A 0583        346           INC DPH     ;POINT TO MSBYTE OF F(PSI) TABLE
014C E4          347           CLR A
014D 93          348           MOVC A,@A+DPTR ;FETCH IT
014E A4          349           MUL AB
014F 2B          350           ADD A,R3    ;ADD LSBYTE TO PREV.RESULT MSBYTE
0150 FB          351           MOV R3,A
0151 E5F0        352           MOV A,B     ;GET MSBYTE FROM B
0153 3400        353           ADDC A,#0
0155 FA          354           MOV R2,A    ;R2,R3=THETA INCREMENT(*(2**(-16)))
                 355           ;
                 356           ;   NOTE: R5,R6,R7 HOLD THE THETA
                 357           ;         INTEGRAL (*(2**(-16)))
                 358           ;
0156 200F0D      359           JB 21H.7,LB32 ;JUMP IF THE THETA INC. IS NEG.
0159 00          360           NOP
015A EF          361           MOV A,R7
015B 2B          362           ADD A,R3
015C FF          363           MOV R7,A
015D EE          364           MOV A,R6
015E 3A          365           ADDC A,R2
015F FE          366           MOV R6,A
0160 ED          367           MOV A,R5
0161 3400        368           ADDC A,#0
0163 FD          369           MOV R5,A
0164 800D        370           SJMP LB33   ; R5,R6,R7 NOW UPDATED
                 371                       ; (R5 CONTAINS THE SLIP ANGLE)
0166 C3          372     LB32: CLR C
0167 EF          373           MOV A,R7
0168 9B          374           SUBB A,R3
0169 FF          375           MOV R7,A
016A EE          376           MOV A,R6
016B 9A          377           SUBB A,R2
016C FE          378           MOV R6,A
016D ED          379           MOV A,R5
016E 9400        380           SUBB A,#0
0170 FD          381           MOV R5,A
0171 8000        382           SJMP LB33   ; R5,R6,R7 NOW UPDATED
                 383                       ; (R5 CONTAINS THE SLIP ANGLE)
                 384           ;
                 385     ;*******************************************
                 386     ;PROCEDURE TO GENERATE IA AND IC REFERENCE
                 387     ;VALUES FOR OUTPUT. ENTER THIS ROUTINE WITH
                 388     ;IDVAL(0-FFH) IN 01H AND IQVAL(0-FFH) IN 11H
                 389     ;AND SIGN IDVAL IN 20H.7 AND SIGN IQVAL
                 390     ;IN 21H.7 AND A=SLIP ANGLE.
                 391     ;
```

```
0173 258A       392     LB33: ADD A,TLO
0175 258A       393           ADD A,TLO
0177 C3         394           CLR C
0178 958B       395           SUBB A,TL1      ;A=TOTAL CONTROL FRAME ANGLE
017A F582       396           MOV DPL,A
017C 758306     397           MOV DPH,#6      ;POINT TO SINEWAVE TABLE
                398           ;
017F 75D018     399           MOV PSW,#18H    ;SELECT REGISTER BANK 3
0182 852022     400           MOV 22H,20H
0185 852123     401           MOV 23H,21H     ;COPY SIGNS OF IDVAL AND IQVAL
0188 8501F0     402           MOV B,01H       ;LOAD B WITH IDVAL
018B 7400       403           MOV A,#0        ;POINT TO SIN(PHI)
018D 93         404           MOVC A,@A+DPTR  ;FETCH IT
018E 6220       405           XRL 20H,A       ;20H.7 CONTAINS SIGN FOR
                406                           ;UPCOMING PRODUCT
0190 C2E7       407           CLR ACC.7
0192 A4         408           MUL AB          ;AB=ID*SIN(PHI)
0193 AFF0       409           MOV R7,B        ;SAVE MSBYTE ONLY
0195 8511F0     410           MOV B,011H      ;LOAD B WITH IQVAL
0198 7440       411           MOV A,#64       ;POINT TO COS(PHI)
019A 93         412           MOVC A,@A+DPTR  ;FETCH IT
019B 6221       413           XRL 21H,A       ;21H.7 CONTAINS SIGN FOR
                414                           ;UPCOMING PRODUCT
019D C2E7       415           CLR ACC.7
019F A4         416           MUL AB          ;AB=IQ*COS(PHI)
                417           ;NOTE:MUL CLEARS CARRY
01A0 E4         418           CLR A           ;A=0
01A1 300F05     419           JNB 21H.7,LB40
01A4 95F0       420           SUBB A,B        ;RESULT WAS NEG.- SUBTR.MSBYTE
01A6 C3         421           CLR C           ;RESET THE CARRY
01A7 8005       422           SJMP LB41
01A9 25F0       423     LB40: ADD A,B         ;RESULT WAS POS.- ADD MSBYTE
01AB 00         424           NOP
01AC 8000       425           SJMP LB41
01AE 300703     426     LB41: JNB 20H.7,LB42  ;JUMP IF PREVIOUS PRODUCT
                427                           ;WAS POS. CONT FOR NEG.
01B1 9F         428           SUBB A,R7
01B2 8003       429           SJMP LB43
01B4 2F         430     LB42: ADD A,R7
01B5 8000       431           SJMP LB43
01B7 2480       432     LB43: ADD A,#128      ;A=IA IN 2'S COMPLEMENT + 128
01B9 F4         433           CPL A
01BA 7800       434           MOV R0,#0
01BC F2         435           MOVX @R0,A      ;O/P IA IN COMP.OFF.BIN.TO PORT 0
                436           ;*******************************************
                437           ;REPEAT THE PRECEDING PROCEDURE FOR CALC.OF IC
                438           ;
01BD 8501F0     439           MOV B,01H       ;LOAD B WITH IDVAL
01C0 7455       440           MOV A,#85       ;POINT TO SIN(PHI + 120)
01C2 93         441           MOVC A,@A+DPTR  ;FETCH IT
01C3 6222       442           XRL 22H,A       ;22H.7 CONTAINS THE SIGN OF
                443                           ;UPCOMING PRODUCT
01C5 C2E7       444           CLR ACC.7
01C7 A4         445           MUL AB          ;AB=ID*SIN(PHI+120)
01C8 AFF0       446           MOV R7,B        ;SAVE ONLY THE MSBYTE
01CA 8511F0     447           MOV B,11H       ;LOAD B WITH IQVAL
01CD 7495       448           MOV A,#149      ;POINT TO COS(PHI+120)
01CF 93         449           MOVC A,@A+DPTR  ;FETCH IT
01D0 6223       450           XRL 23H,A       ;23H.7 CONTAINS THE SIGN OF
                451                           ;THE UPCOMING PRODUCT
01D2 C2E7       452           CLR ACC.7
01D4 A4         453           MUL AB          ;AB=IQ*COS(PHI+120)
                454           ;NOTE:MUL CLEARS CARRY
01D5 E4         455           CLR A           ;A=0
01D6 301F05     456           JNB 23H.7,LB44
01D9 95F0       457           SUBB A,B        ;RESULT WAS NEG.,SUBTR. MSBYTE
01DB C3         458           CLR C           ;RESET CARRY
01DC 8005       459           SJMP LB45
01DE 25F0       460     LB44: ADD A,B         ;RESULT WAS POSITIVE, ADD MSBYTE
01E0 00         461           NOP
01E1 8000       462           SJMP LB45
01E3 301703     463     LB45: JNB 22H.7,LB46
01E6 9F         464           SUBB A,R7       ;PREV.PRODUCT WAS NEG.,SUBTR.IT
01E7 8003       465           SJMP LB47
01E9 2F         466     LB46: ADD A,R7        ;PREV.PRODUCT WAS POS., ADD IT
01EA 8000       467           SJMP LB47
```

```
01EC 2480         468         LB47: ADD A,#128  ;A=IC IN 2'S COMP PLUS 128
01EE F4           469               CPL A
01EF 7801         470               MOV R0,#1
01F1 F2           471               MOVX @R0,A    ;O/P IC IN COMP.OFF.BIN TO PORT 1
                  472         ;
                  473         ;*******************************************
                  474         ;OUTPUT THE FLUX VALUE C(N+1) TO PORT 4
01F2 7804         475               MOV R0,#4
01F4 E525         476               MOV A,25H
01F6 F2           477               MOVX @R0,A
                  478         ;*******************************************
                  479         ;OUTPUT SELECTED RAM CONTENTS TO TEST PORT
01F7 A890         480               MOV R0,P1     ;GET SELECTION FROM PORT 1
01F9 E6           481               MOV A,@R0     ;FETCH CONTENTS
01FA F3           482               MOVX @R1,A    ;O/P TO PORT 6 (NOTE:R1=#6)
01FB 020003       483               LJMP LB11
                  484               END
```

| Symbol | Type | Address | |
|---|---|---|---|
| ACC. | D ADDR | 00E0H | A |
| B. | D ADDR | 00F0H | A |
| DPH. | D ADDR | 0083H | A |
| DPL. | D ADDR | 0082H | A |
| LB1. | C ADDR | 0795H | A |
| LB11. | C ADDR | 0003H | A |
| LB12. | C ADDR | 0095H | A |
| LB13. | C ADDR | 004EH | A |
| LB14. | C ADDR | 005AH | A |
| LB2. | C ADDR | 002DH | A |
| LB20. | C ADDR | 0021H | A |
| LB21. | C ADDR | 0028H | A |
| LB30. | C ADDR | 0129H | A |
| LB31. | C ADDR | 012CH | A |
| LB32. | C ADDR | 0166H | A |
| LB33. | C ADDR | 0173H | A |
| LB40. | C ADDR | 01A9H | A |
| LB41. | C ADDR | 01AEH | A |
| LB42. | C ADDR | 01B4H | A |
| LB43. | C ADDR | 01B7H | A |
| LB44. | C ADDR | 01DEH | A |
| LB45. | C ADDR | 01E3H | A |
| LB46. | C ADDR | 01E9H | A |
| LB47. | C ADDR | 01ECH | A |
| LB5. | C ADDR | 009FH | A |
| LB50. | C ADDR | 0137H | A |
| LB51. | C ADDR | 013AH | A |
| LB6. | C ADDR | 00C8H | A |
| LB60. | C ADDR | 00E9H | A |
| LB61. | C ADDR | 00F2H | A |
| LB7. | C ADDR | 010AH | A |
| LB8. | C ADDR | 010DH | A |
| P1. | D ADDR | 0090H | A |
| P3. | D ADDR | 00B0H | A |
| PSW. | D ADDR | 00D0H | A |
| TCON. | D ADDR | 0088H | A |
| TL0. | D ADDR | 008AH | A |
| TL1. | D ADDR | 008BH | A |
| TMOD. | D ADDR | 0089H | A |
| X1. | NUMB | 003CH | A |
| X2. | NUMB | 00B4H | A |
| X3. | NUMB | 002AH | A |
| X4. | NUMB | 0008H | A |
| X5. | NUMB | 0080H | A |

REGISTER BANK(S) USED: 0

ASSEMBLY COMPLETE, NO ERRORS FOUND

8031 Code Memory Usage

| Location | Description |
|---|---|
| 000H-1FDH | Control program (constant execution time) |
| 795H-7A4H | Initialization routine |
| 200H-2FFH | Lookup table (Flux reference vs. speed) |
| 300H-3FFH | Lookup table (ALIM vs. $i_d$ reference) |
| 400H-5FFH | Lookup table (F(psi) vs psi) This table contains precalculated constants which must be multiplied by $i_q$ to obtain the slip integral increments. The values are two-byte numbers. 400H-4FFH = LSByte   500H-5FFH = MSByte |
| 600H-794H | Lookup table (Sine(theta) vs. theta) The scaling of theta is determined from the number of shaft encoder pulses per electrical cycle (256). The sine values are stored as modulus values (max.127) and the negative values are indicated by adding 128 (max.255). |

I claim:

1. In an AC induction motor drive including:
first means responsive to a flux demand for generating a first signal representative of a direct component reference current;
second means responsive to a torque demand for generating a second signal representative of a quadrature component reference current;
third means responsive to a speed signal for generating a third signal representative of a position angle characterizing the current resultant vector of said direct and quadrature components; and
fourth means responsive to said first, second and third signals for generating three coordinate phase currents for the motor drive; the combination of
means within said first means for dynamically responding to said flux demand and first limiting means respopnsive to said dynamically responding means for limiting said first signal in magnitude within a predetermined maximum value LIM;
second limiting means responsive to said first limiting means for establishing with said first signal a limit ALIM defined by the square of said first signal being made equal to (LIM$^2$-ALIM$^2$); said second limiting means being operative upon said second means for limiting said second signal so that said resultant vector remain within the limit ALIM.

2. The motor drive of claim 1 with said first limiting means establishing a limit ±LIM to said first signal when the motor drive experienced a speed change outside normal speed range of operation of the motor drive; and
with said second limiting means establishing a limit ALIM for said second signal, the limit ALIM being defined by the square of said first signal being equal to (LIM$^2$−ALIM$^2$).

3. The motor drive of claim 2 with the provision of computer means for computing ALIM=$\sqrt{(LIM^2-i_d^2)}$; where $i_d$ is the amplitude of the first signal as derived from said first means.

4. The motor drive of claim 3 with said microprocessor means being responsive to a speed representative signal and providing in relation thereto said flux demand signal, said flux demand being constant in said speed range, and said flux demand having a gradient in relation to the speed outside said range;
whereby said first signal is varied in relation with said flux demand gradient and within said limit ±LIM when the speed is outside said speed range.

* * * * *